US009154822B2

(12) United States Patent
Wang et al.

(10) Patent No.: US 9,154,822 B2
(45) Date of Patent: Oct. 6, 2015

(54) METHOD, APPARATUS, AND TERMINAL DEVICE FOR SHARING INTERNET PROTOCOL TELEVISION CONTENT

(71) Applicant: Huawei Device Co., LTD, Shenzhen (CN)

(72) Inventors: Lei Wang, Beijing (CN); Shunan Fan, Beijing (CN); Wenmei Gao, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 14/026,637

(22) Filed: Sep. 13, 2013

(65) Prior Publication Data

US 2014/0020039 A1  Jan. 16, 2014

Related U.S. Application Data

(63) Continuation of application No. PCT/CN2012/072289, filed on Mar. 14, 2012.

(30) Foreign Application Priority Data

Mar. 15, 2011  (CN) .......................... 2011 1 0061132

(51) Int. Cl.
*H04N 21/258* (2011.01)
*H04N 21/61* (2011.01)
(Continued)

(52) U.S. Cl.
CPC ...... *H04N 21/25866* (2013.01); *H04L 65/1016* (2013.01); *H04L 65/1093* (2013.01);
(Continued)

(58) Field of Classification Search
None
See application file for complete search history.

(56) References Cited

U.S. PATENT DOCUMENTS 8,077,717 B2 *  12/2011  Yan et al. ....................... 370/390
8,239,898 B2 *  8/2012  Rahman .......................... 725/87
(Continued)

FOREIGN PATENT DOCUMENTS

CN    101087442 A      12/2007
CN    101159850 A  *    4/2008
(Continued)

OTHER PUBLICATIONS

NPL—Rochester Institute of Technology RIT Scholars Works—Internet protocol television (IPTV): The Killer application for the next generation—2007.*

(Continued)

*Primary Examiner* — Nasser Goodarzi
*Assistant Examiner* — Terrika Peterson
(74) *Attorney, Agent, or Firm* — Slater & Matsil, L.L.P.

(57) ABSTRACT

A method, an apparatus and a terminal device can be used for sharing Internet protocol television content. The method includes receiving a request message that is sent by a first terminal and includes a receiving terminal identifier. The request message is used for the instruction of providing a receiving terminal, which corresponds to the receiving terminal identifier, with IPTV content that is being played by a second terminal. The method further includes obtaining identification information of the IPTV content that is being played by the second terminal. The identification information includes a content identifier, a channel identifier, or a multicast address. The method further includes providing, according to the identification information, the receiving terminal with the IPTV content that is being played by the second terminal.

8 Claims, 19 Drawing Sheets

(51) Int. Cl.
*H04N 21/658* (2011.01)
*H04L 29/06* (2006.01)

(52) U.S. Cl.
CPC ........ *H04L65/4076* (2013.01); *H04L 65/4084* (2013.01); *H04N 21/25875* (2013.01); *H04N 21/6125* (2013.01); *H04N 21/6175* (2013.01); *H04N 21/6581* (2013.01)

(56) References Cited

U.S. PATENT DOCUMENTS

| | | |
|---|---|---|
| 8,528,028 B2 * | 9/2013 | Sheth et al. ............... 725/91 |
| 8,763,032 B2 * | 6/2014 | Hjelm et al. ............... 725/34 |
| 8,789,086 B2 * | 7/2014 | McCoy et al. ............. 725/25 |
| 8,839,321 B2 * | 9/2014 | Elbarky .................... 725/93 |
| 2006/0123455 A1 * | 6/2006 | Pai et al. ................. 725/133 |
| 2008/0201754 A1 * | 8/2008 | Arling et al. ............. 725/114 |
| 2009/0133069 A1 * | 5/2009 | Conness et al. ........... 725/46 |
| 2009/0133088 A1 * | 5/2009 | Kim et al. ............... 725/116 |
| 2009/0183211 A1 * | 7/2009 | Yan et al. ................ 725/88 |
| 2010/0005517 A1 * | 1/2010 | Foti ........................... 726/6 |
| 2010/0254370 A1 | 10/2010 | Jana et al. |
| 2012/0030554 A1 * | 2/2012 | Toya ........................ 715/206 |
| 2013/0054634 A1 * | 2/2013 | Chakraborty et al. ....... 707/769 |
| 2013/0298203 A1 * | 11/2013 | Ansari et al. ............... 726/4 |
| 2014/0068090 A1 * | 3/2014 | Wang et al. ............. 709/227 |
| 2014/0068691 A1 * | 3/2014 | Gao et al. ............... 725/110 |
| 2014/0115641 A1 * | 4/2014 | Zhang et al. ............. 725/93 |
| 2014/0123197 A1 * | 5/2014 | Park et al. .............. 725/109 |

FOREIGN PATENT DOCUMENTS

| | | |
|---|---|---|
| CN | 101309395 A | 11/2008 |
| CN | 101317434 A | 12/2008 |
| CN | 101631388 A | 1/2010 |
| CN | 101883147 A | 11/2010 |
| CN | 101945252 A | 1/2011 |
| EP | 2150014 A1 | 2/2010 |
| WO | 2010001329 A1 | 1/2010 |
| WO | WO 2010100937 A1 * | 9/2010 ............ H04N 7/173 |

OTHER PUBLICATIONS

OIPF Release 2 Specification vol. 4—Protocols [V2.1 (edit007)], Open IPTV Forum, May 20, 2011, 309 pages.
OIPF Release 2 Specification vol. 4a—Examples of IPTV Protocols Sequences [V2.1 (edit005)], Open IPTV Forum, Mar. 10, 2011, 82 pages.
Chinese Office Action received in Application No. 201110061132.1 mailed Jan. 16, 2014, 6 pages.
International Search Report received in Application No. PCT/CN2012/072289 mailed Jun. 21, 2012, 7 pages.

* cited by examiner

METHOD, APPARATUS, AND TERMINAL DEVICE FOR SHARING INTERNET PROTOCOL TELEVISION CONTENT

CROSS-REFERENCE TO RELATED APPLICATIONS

This application is a continuation of International Application No. PCT/CN2012/072289, filed on Mar. 14, 2012, which claims priority to Chinese Patent Application No. 201110061132.1, filed on Mar. 15, 2011, both of which are hereby incorporated by reference in their entireties.

TECHNICAL FIELD

Embodiments of the present invention relate to the field of communications technologies, and in particular, to a method, an apparatus, and a terminal device for sharing Internet protocol television content.

BACKGROUND

Internet protocol television (IPTV) is a manageable multimedia service that transmits television, video, texts, images, and data over an IP network and provides QoS (quality of service)/QoE (quality of experience), security, interactivity and reliability. An IPTV technology integrates multiple technologies such as an Internet technology, a multimedia technology, and a communication technology, uses a broadband network as infrastructure, uses a household television, a personal computer, or a mobile phone as a major display terminal, and provides, through the IP protocol, a user with various interactive multimedia services including a digital television program.

A video sharing (Video Share) service refers to a service in which a user initiates video sharing to a peer end of a call in a call process. A shared object may be video that is captured by a mobile terminal through a camera in real time, or a video clip file stored in the mobile terminal. In a call process, a user may randomly initiate or terminate the service. Later, a sharing technology is extended. Sharing content is not limited to video, but may also be discrete media, and such sharing is collectively referred to as content share.

A current video sharing solution is provided as follows. A share initiator terminal sends a request message (for example, SIP Invite), where the request message is forwarded by an application server to a share receiver terminal, and an Accept-Contact header field of the request message carries a characteristic identifier (for example, "+g.3gpp.cs-voice"), which indicates what is initiated is a video sharing service. The share receiver terminal returns a reply message (for example, SIP 183), where SDP information of the reply message carries a media type and an encoding type that are received by the share receiver terminal, and the reply message is also forwarded by an AS to the share initiator terminal. Subsequently, resources are reserved at the share initiator terminal and the share receiver terminal separately, and after the resources are successively reserved, the share initiator terminal performs real-time video sharing with the share receiver terminal through an RTP packet.

In the foregoing content sharing solution provided in the prior art, a share initiator terminal initiates a share request message to perform content sharing. However, most existing set-top box IPTV terminal function (ITF) do not support a content sharing feature, and a user cannot use these current terminals to initiate a content sharing service. If such current terminals are improved, a cost is relatively high. Therefore, an existing IPTV system cannot support a content sharing service effectively.

SUMMARY OF THE INVENTION

Embodiments of the present invention provide a method, an apparatus, and a terminal device for sharing IPTV content, so as to enhance the support of an existing IPTV system for a content sharing service.

An embodiment of the present invention provides a method for sharing IPTV content, where the method includes receiving a request message that is sent by a first terminal and includes a receiving terminal identifier. The request message is used for the instruction of providing a receiving terminal, which corresponds to the receiving terminal identifier, with IPTV content that is being played by a second terminal. The request message is further used for obtaining identification information of the IPTV content that is being played by the second terminal. The identification information includes a content identifier, a channel identifier, or a multicast address. The request message is also used for providing, according to the identification information, the receiving terminal with the IPTV content that is being played by the second terminal.

An embodiment of the present invention further provides another method for sharing IPTV content, where the method includes obtaining, by a first terminal, from an IPTV control server, identification information of IPTV content that is being played by a second terminal. The identification information includes a content identifier, a channel identifier, or a multicast address. The method further provides for sending, by the first terminal, a request message to a content sharing application server, where the request message carries the identification information and a receiving terminal identifier, and the request message is used for instructing the content sharing application server to provide a receiving terminal, which corresponds to the receiving terminal identifier, with the IPTV content that is being played by the second terminal.

An embodiment of the present invention further provides an apparatus for sharing IPTV content, where the apparatus includes a first receiving module, configured to receive a request message that is sent by a first terminal and includes a receiving terminal identifier, where the request message is used for the instruction of providing a receiving terminal, which corresponds to the receiving terminal identifier, with IPTV content that is being played by a second terminal. The apparatus further includes a first obtaining module, configured to obtain identification information of the IPTV content that is being played by the second terminal. The identification information includes a content identifier, a channel identifier, or a multicast address, and a first content providing module, configured to provide, according to the identification information, the receiving terminal with the IPTV content that is being played by the second terminal.

An embodiment of the present invention further provides a terminal device, including a second obtaining module, configured to obtain, from an IPTV control server, identification information of IPTV content that is being played by a second terminal. The identification information includes a content identifier, a channel identifier, or a multicast address, and a processing module, configured to send a request message to a content sharing application server, where the request message carries the identification information and a receiving terminal identifier, and where the request message is used for instructing the content sharing application server to provide a receiving terminal, which corresponds to the receiving terminal identifier, with the IPTV content that is being played by the second terminal.

With the method for sharing IPTV content provided in the foregoing embodiment of the present invention, a request message is sent by a different terminal. That is, a first terminal may initiate sharing of IPTV content that is being played by a second terminal, so that when a device such as a set-top box is used to play IPTV content in the prior art, sharing of the played IPTV content can also be implemented without greatly improving the device such as the set-top box, thereby effectively improving the support of an existing IPTV system for a content sharing service.

BRIEF DESCRIPTION OF THE DRAWINGS

To describe the technical solutions in the embodiments of the present invention more clearly, the accompanying drawings required for describing the embodiments or the prior art are briefly introduced in the following. The accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention more comprehensible, the technical solutions in the embodiments of the present invention are clearly described with reference to the accompanying drawings in the embodiments of the present invention. The embodiments to be described are merely a part rather than all of the embodiments of the present invention. All other embodiments obtained by persons of ordinary skill in the art based on the embodiments of the present invention without creative efforts shall fall within the protection scope of the present invention.

Figure 1:
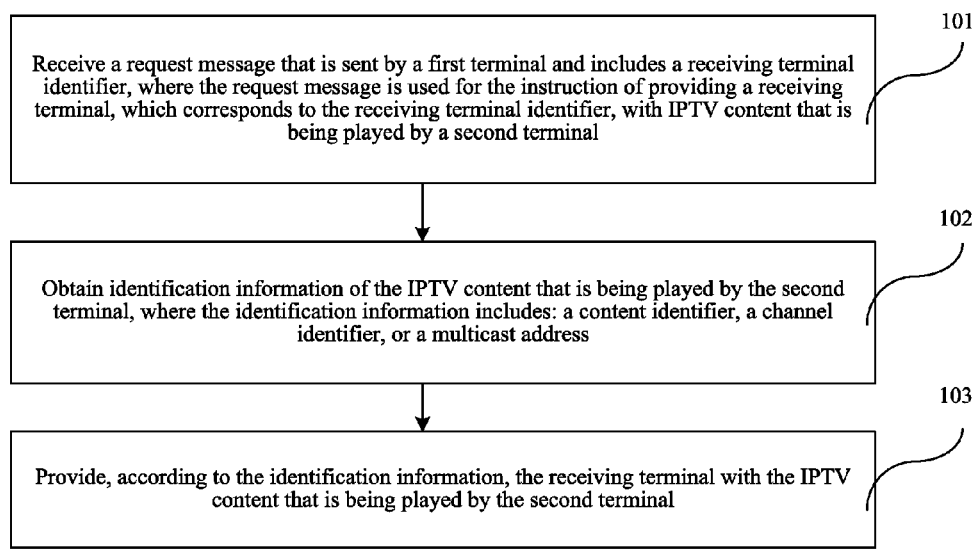
FIG. 1 is a schematic flow chart of a first embodiment of a method for sharing IPTV content according to the present invention.

An embodiment of the present invention provides a method for sharing IPTV content. FIG. 1 is a schematic flow chart of an embodiment of a method for sharing IPTV content according to the present invention. As shown in FIG. 1, the method includes the following steps.

Step 101: Receive a request message that is sent by a first terminal and includes a receiving terminal identifier, where the request message is used for the instruction of providing a receiving terminal, which corresponds to the receiving terminal identifier, with IPTV content that is being played by a second terminal.

In a general case, the request message may be an SIP Invite message, where the SIP Invite message carries identification information such as an address or an SIP URI of a receiving terminal.

Step 102: Obtain identification information of the IPTV content that is being played by the second terminal, where in this embodiment, the identification information includes a content identifier, a channel identifier, or a multicast address.

It should be noted that the identification information may further include other identifiers, addresses, or URLs, which are not enumerated one by one herein, and which do not limit the present invention.

Step 103: Provide, according to the identification information, the receiving terminal with the IPTV content that is being played by the second terminal.

In the method for sharing IPTV content provided in the foregoing embodiment of the present invention, the first terminal and the second terminal may be differentiated according to a capability of a terminal. For example, the first terminal may be a terminal that supports sharing, for example, a user equipment such as a mobile phone or a newly produced ITF terminal. The second terminal may be a terminal that does not support content sharing, for example, a user equipment such as a set-top box. A content sharing request is initiated by the first terminal, so that sharing of IPTV content that is played by the second terminal can be implemented without improving the second terminal such as the set-top box.

The first terminal and the second terminal may be bound terminals that belong to the same user, that is, correspondence between the first terminal and the second terminal has been already set at a content sharing application server or an IPTV control server. The first terminal sends a request message, a query request message for content that is played by the second terminal, or a content subscription message for content that is played by the second terminal, which may be considered as operations on the second terminal. In another implementation manner, the first terminal may carry a user identifier of a home user of the second terminal in a sent request message, which indicates that the first terminal is querying for the identification information of the IPTV content that is being played by the second terminal, or is to share the IPTV content that is played by the second terminal.

In addition, in step 102 in the foregoing embodiment, the identification information of the IPTV content that is being played by the second terminal may be obtained in two manners. One is that the identification information may be obtained by a content sharing application server from an IPTV control server, and the other is that the identification information may be obtained by the first terminal from an IPTV control server and is carried in the request message that includes the receiving terminal identifier.

In the first manner, the foregoing step 102 may be specifically as follows. A content sharing application server sends a query request message that includes a user identifier of a home user of the second terminal to an IPTV control server and receives a query response message that is returned by the IPTV control server and includes the identification information of the IPTV content that is being played by the second terminal. Alternatively, a content sharing application server sends a subscription message that includes a user identifier of a home user of the second terminal to an IPTV control server and receives a notification message that is returned by the IPTV control server and includes the identification information of the IPTV content that is being played by the second terminal.

In the second manner, the obtaining the identification information in the foregoing step 102 includes the following. The first terminal obtains the identification information by querying an IPTV control server, or the first terminal obtains the identification information by subscribing with an IPTV control server.

In the foregoing step 103, the providing, according to the identification information, the receiving terminal with the IPTV content that is being played by the second terminal may be directly providing the receiving terminal with the IPTV content, and may also be indirectly providing the receiving terminal with the IPTV content. The direct providing is that a content sharing application server obtains, according to the identification information, the IPTV content that is being played by the second terminal, and delivers the IPTV content to the receiving terminal, which may be specifically completed by a media resource function processor (MRFP) of the content sharing application server. The indirect providing is that the identification information of the IPTV content that is being played by the second terminal is sent to the receiving terminal, and the receiving terminal obtains, according to the identification information, the IPTV content that is being played by the second terminal.

Figure 2:
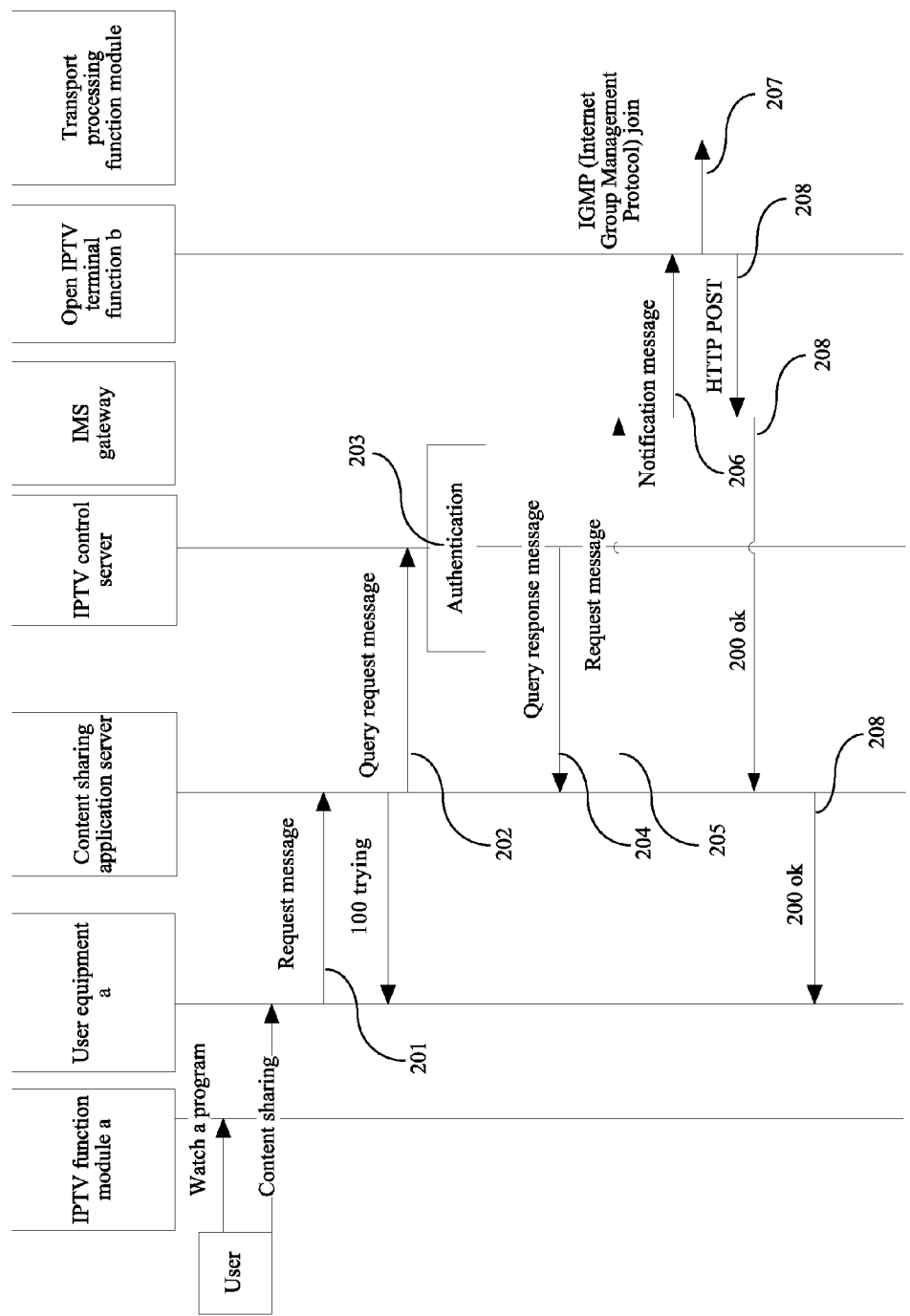
FIG. 2 is a schematic flow chart of a first specific embodiment of the present invention.

The present invention further provides multiple specific implementation manners, for example, FIG. 2 is a schematic flow chart of a first specific embodiment of the present invention. A first terminal in this embodiment is represented by UEa, where UE represents a user equipment. A second terminal may be a set-top box and is represented by ITFa. Both of the two terminals belong to the same user, and the user is watching an IPTV program through the ITFa. The user initiates content sharing through the UEa. Furthermore, in this embodiment, the UEa initiates a request message. The request message triggers querying, by a content sharing application server, an IPTV control server, so as to obtain identification information of IPTV content that is being played by the ITFa. Moreover, the content sharing application server sends the obtained identification information to a receiving terminal (including an IG and an OITFb), where the IG is an IMS gateway and an OITF is an open IPTV terminal function. The OITFb obtains IPTV content that is being played by the ITFa from an IPTV content providing module according to the identification information. The following steps are specifically included.

Step 201: A UEa sends a request message (Invite) that includes a receiving terminal identifier to a content sharing application server (content sharing AS), where the request message is used for the instruction of providing a receiving terminal, which corresponds to the receiving terminal identifier, with IPTV content that is being played by an ITFa that belongs to the same user with the UEa. Specifically, the UEa and the ITFa may be bound beforehand, and the foregoing request message does not need to carry a user identifier of a home user. After the request message of the UEa is received, it may be directly determined that program content that is being played by the ITFa is to be shared. Alternatively, in the case that the UEa and the ITFa are not bound, the foregoing request message may specifically carry a user identifier of a home user by adding a "@WhatOnTV" identifier in a uniform resource identifier (URI) in an extended manner. In addition, the request message may further carry a permission parameter of the home user. In this step, the request message may further carry the permission parameter of the home user. Moreover, the content sharing application server returns a 100 trying temporary response to the UEa, which indicates that processing is being performed.

Step 202: The content sharing application server sends a query request message (Request) that includes a user identifier to an IPTV control server (IPTV control), where the message may further carry a permission parameter.

Step 203: After performing authentication on the request sent by the content sharing application server and determining that the content sharing application server has query permission, the IPTV control server finds identification information of the IPTV content that is being played by the ITFa, where the identification information may be a content identifier (content ID) or access information of a channel (including information such as a channel identifier or a multicast address).

Step 204: The IPTV control server returns a query response message (Response) to the content sharing application server, where the query response message carries the identification information of the IPTV content that is being played by the ITFa, and the identification information may be a content identifier (content ID) or access information of a channel (including information such as a channel identifier or a multicast address).

Step 205: The content sharing application server sends a request message (Invite) to an IMS gateway (IG) of the receiving terminal, where the request message carries identification information of shared content, for example, may be a content identifier (content ID) or access information of a channel (including information such as a channel identifier or a multicast address).

Step 206: The IG sends a notification message (Notification Mechanism) to a managed OITFb device, so as to send the content identifier (content ID) or the access information of the channel (such as the channel identifier or the multicast address) to the OITFb device.

Step 207: The OITFb device accesses a program according to the identification information, for example, performs Internet group management protocol (IGMP) join, to obtain corresponding IPTV content from an IPTV content providing module. In this embodiment of the present invention, the IPTV content providing module may specifically be a transport processing function (TPF).

Step 208: The OITFb device returns a response message (HTTP POST, and 200 ok) to the UEa, so as to determine that sharing is performed normally.

Figure 3:
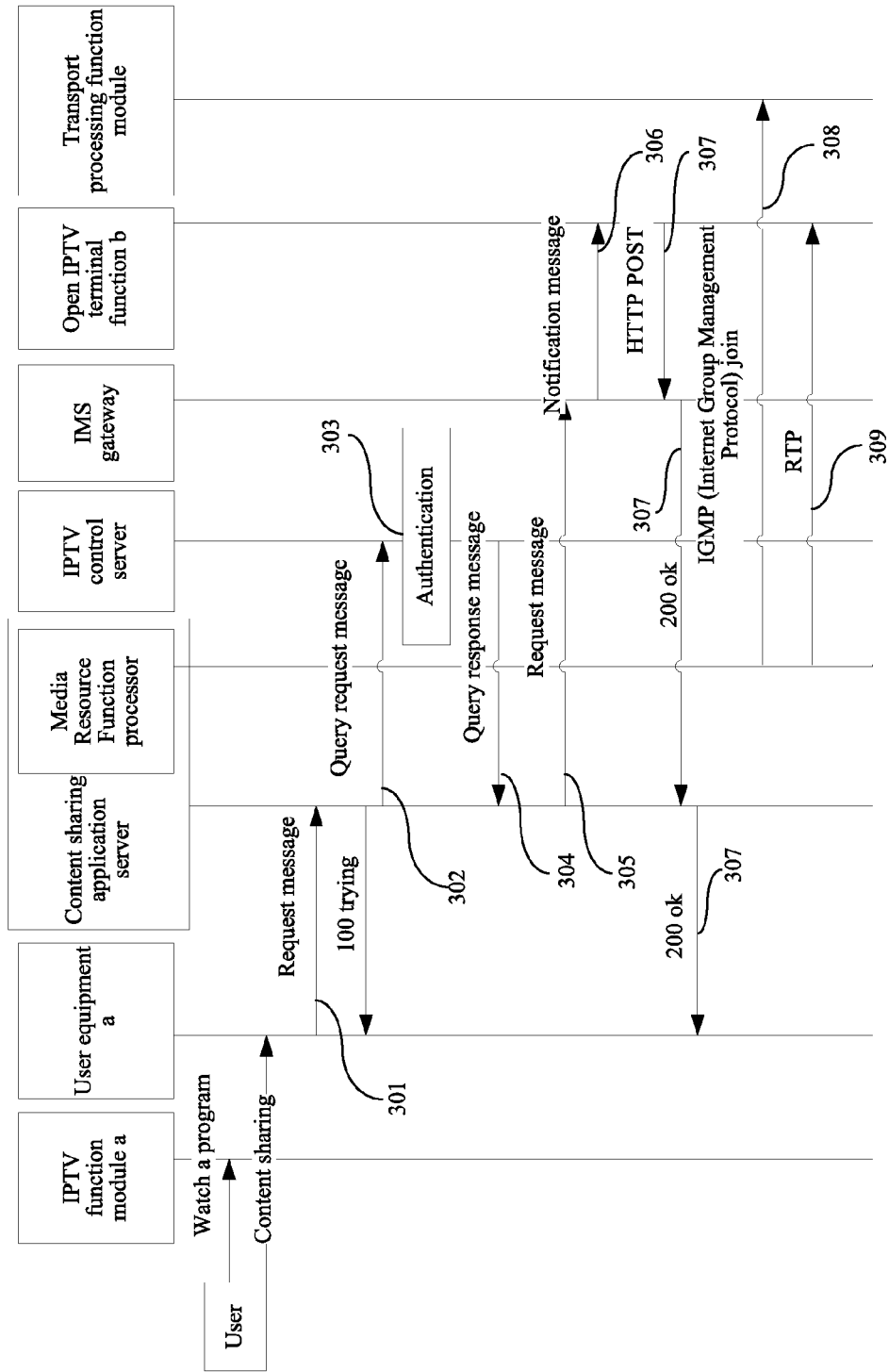
FIG. 3 is a schematic flow chart of a second specific embodiment of the present invention.

FIG. 3 is a schematic flow chart of a second specific embodiment of the present invention. In this embodiment, a UEa sends a request message to trigger obtaining, by a content sharing application server by querying an IPTV control server, identification information of IPTV content that is being played by the second terminal, which is the same as that in the embodiment shown in FIG. 2. A difference lies in that a request message sent by the content sharing application server to a receiving terminal does not carry the identification information of the IPTV content that is being played by the second terminal; instead, an MRFP is directly responsible for providing IPTV content. The following steps are specifically included.

Step 301 to step 304 are the same as the foregoing steps 201 to 204.

Step 305: The content sharing application server sends a request message (Invite) to an IG of the receiving terminal, where the request message does not carry identification information of shared content.

Step 306: The IG sends a notification message (Notification Mechanism) to a managed OITFb device.

Step 307: The OITFb device returns response message (HTTP POST, and 200 ok) to the UEa.

Step 308: An MRFP performs IGMP join according to the identification information of the IPTV content that is being played by the second terminal, where the identification information is obtained by the content sharing application server from the IPTV control server, so as to obtain corresponding IPTV content.

Step 309: The MRFP delivers the obtained IPTV content that is being played by the second terminal to the OITFb device. Specifically, transmission may be performed according to a real-time transport protocol (real-time transport protocol, hereinafter referred to as RTP).

Figure 4:
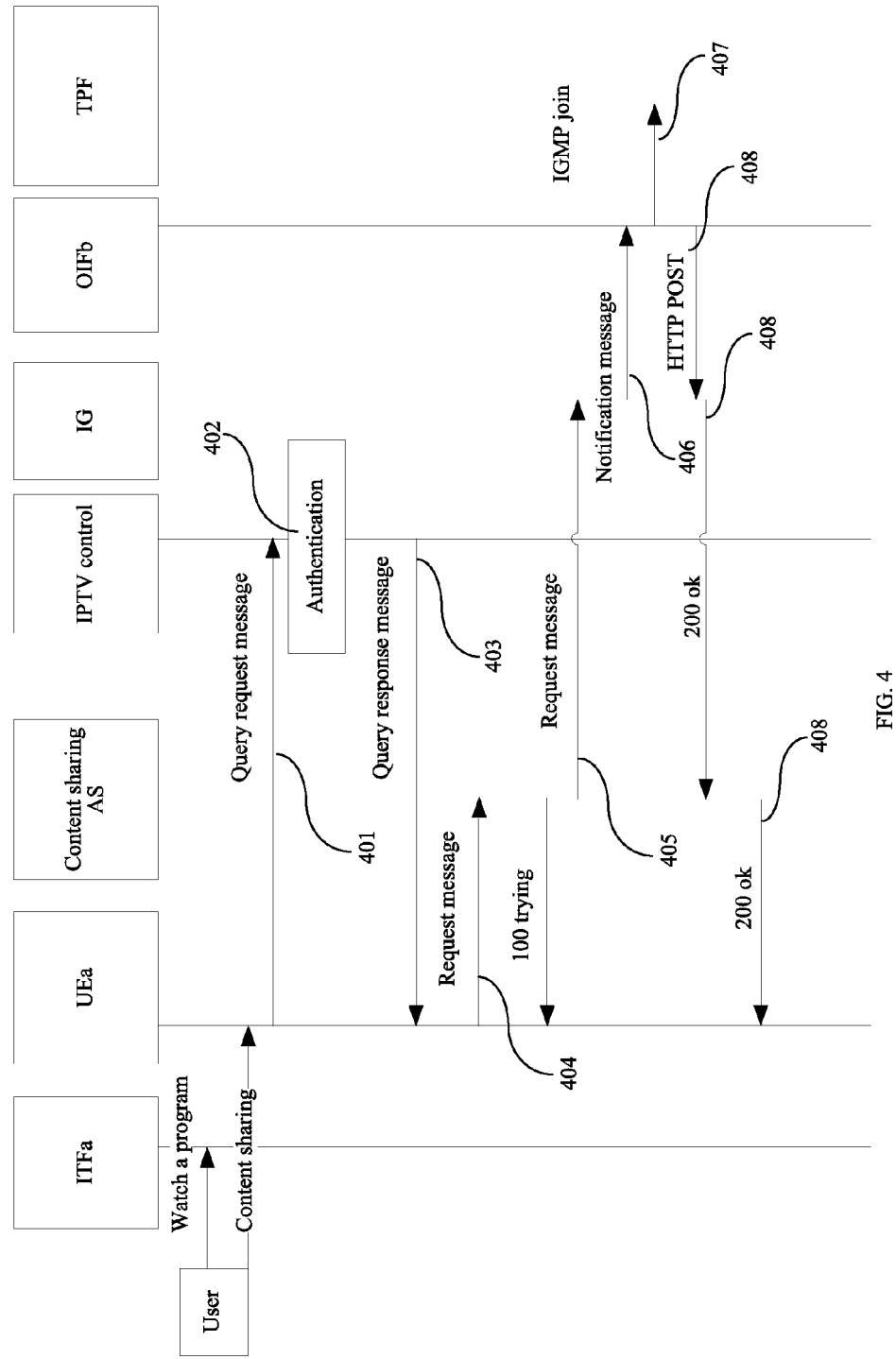
FIG. 4 is a schematic flow chart of a third specific embodiment of the present invention.

FIG. 4 is a schematic flow chart of a third specific embodiment of the present invention. In this specific embodiment, a first terminal UEa initiates a query for identification information of IPTV content to an IPTV controller, where the IPTV content is being played by a second terminal ITFa, so as to obtain, through query, the identification information of the IPTV content that is being played by the second terminal ITFa. The following steps may be specifically included.

Step 401: A UEa sends a query request message (Request) to an IPTV control server, where the query request message carries a user identifier of a home use of the second terminal. In the case that the first terminal and the second terminal are bounded, the user identifier may not be carried, and in order to ensure information security, the query request message may further carry a permission parameter of the home user.

Step 402: After receiving the query request message, the IPTV control server performs authentication according to the permission parameter, and after the authentication succeeds, finds for identification information of IPTV content that is being played by the second terminal ITFa, where the identification information may specifically be a content identifier (content ID) or access information of a channel (including information such as a channel identifier or a multicast address).

Step 403: The IPTV control server returns a query response message (Response) to the first terminal UEa, where the query response message carries the identification information of the IPTV content that is being played by the second terminal.

Step 404: After receiving the foregoing query request, the first terminal UEa sends a request message (Invite) to a content sharing application server, where the request message carries the identification information of the IPTV content that is being played by the second terminal, and at the same time, the content sharing application server returns, to the UEa, a response message (100 trying) indicating that processing is being performed.

Step 405 to step 408 are the same as step 205 to step 208 in the embodiment shown in FIG. 2. Step 305 to step 309 may also be performed, so as to play the IPTV content on an OITF.

Figure 5:
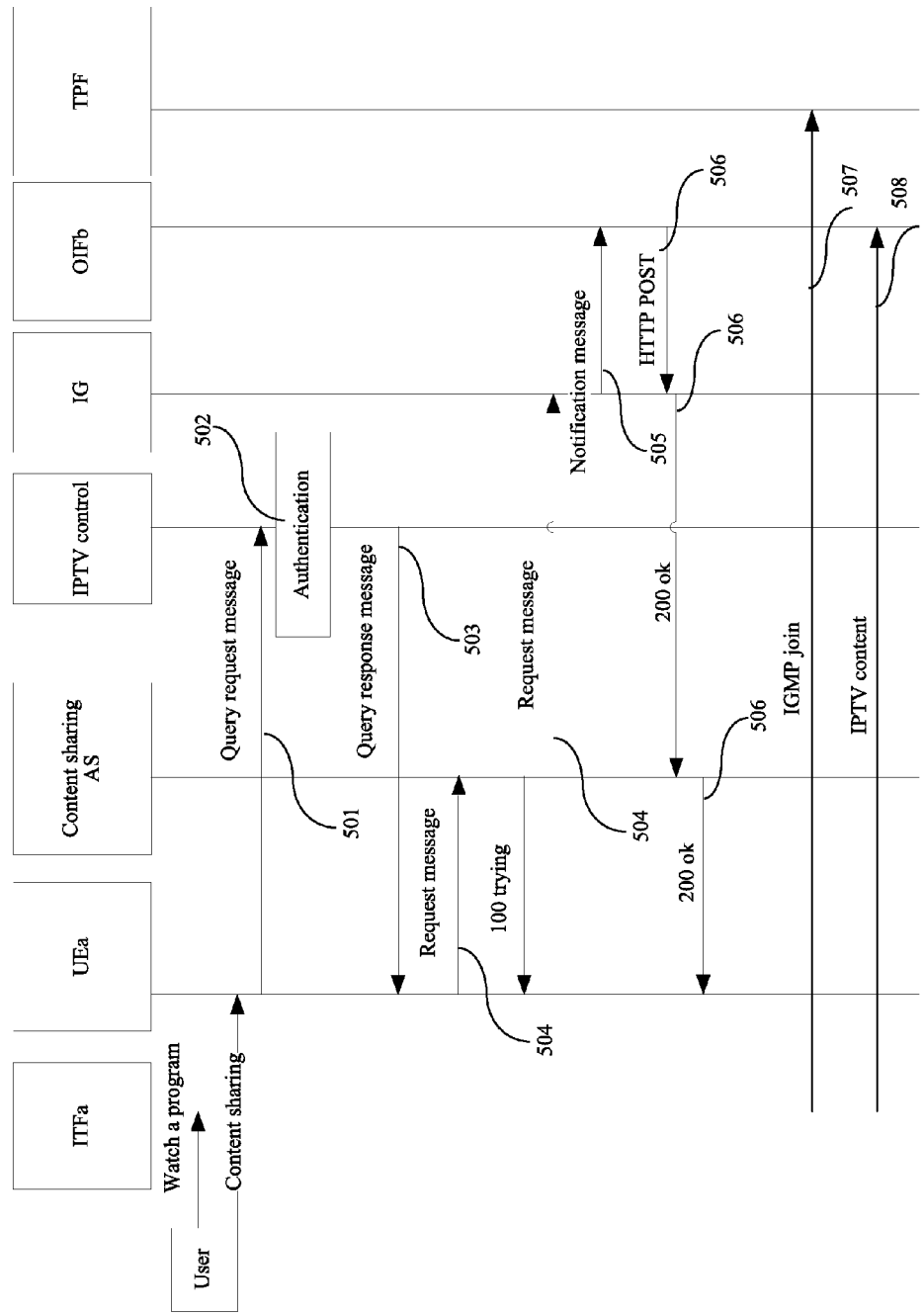
FIG. 5 is a schematic flow chart of a fourth specific embodiment of the present invention.

FIG. 5 is a schematic flow chart of a fourth specific embodiment of the present invention. In this embodiment, a first terminal UEa initiates a query for identification information of IPTV content to an IPTV controller, where the IPTV content is being played by a second terminal ITFa, so as to obtain, through query, the identification information of the IPTV content that is being played by the second terminal ITFa. The following steps may be specifically included.

For step 501 to step 503, reference may be made to the foregoing step 401 to step 403. A first terminal UEa obtains identification information of IPTV content that is being played by a second terminal ITFa.

Step 504: The first terminal UEa sends a request message (Invite) to a receiving terminal, where the request message does not carry the identification information. Specifically, a content sharing application server (Content sharing AS) may forward the request message to an IG of the receiving terminal, and during this process, the content sharing application server may return a response message (100 trying) indicating that the identification is being processed to the UEa.

Step 505: The IG sends a notification message (Notification Mechanism) to an OITF, where the notification message does not carry the identification information either.

Step 506: The OITF returns a response message (HTTP POST, and 200 ok) to the UEa.

Step 507: The UEa performs IGMP join, and obtains corresponding IPTV content from a TPF according to the identification information.

Step 508: The UEa delivers the obtained IPTV content to the OITF, for example, transmission may be performed according to an RTP protocol. In the foregoing embodiment of the present invention, the first terminal UEa or the content sharing application server obtains, from the IPTV control server, the identification information of the IPTV content that is being played by the second terminal, and then provides the receiving terminal with the IPTV content according to the identification information. Specifically, the IPTV content that is played by the second terminal may be provided directly. Alternatively, the identification information of the IPTV content that is played by the second terminal is provided, and is obtained by the second terminal from the TPF. By using the foregoing manner, sharing of the IPTV content between the second terminal and the receiving terminal is implemented. Further, the embodiment of the present invention further provides a technical solution for maintaining synchronization between the second terminal and the receiving terminal when content that is played by the second terminal changes. Specifically, according to identification information of IPTV content that is being played by the second terminal and is updated, the IPTV content that is being played by the second terminal and is updated may be provided for the receiving terminal. In one manner, when returning the identification information of the IPTV content that is being played by the second terminal, the IPTV control server also returns information about updating of played content. Specifically, if the identification information is a channel identifier, a query response message may also carry a channel changing schedule, so that the IPTV content that is being played by the second terminal may be obtained according to the channel changing table in real time, and is played at the receiving terminal. Specifically, the following specific embodiment may be included.

Figure 6:
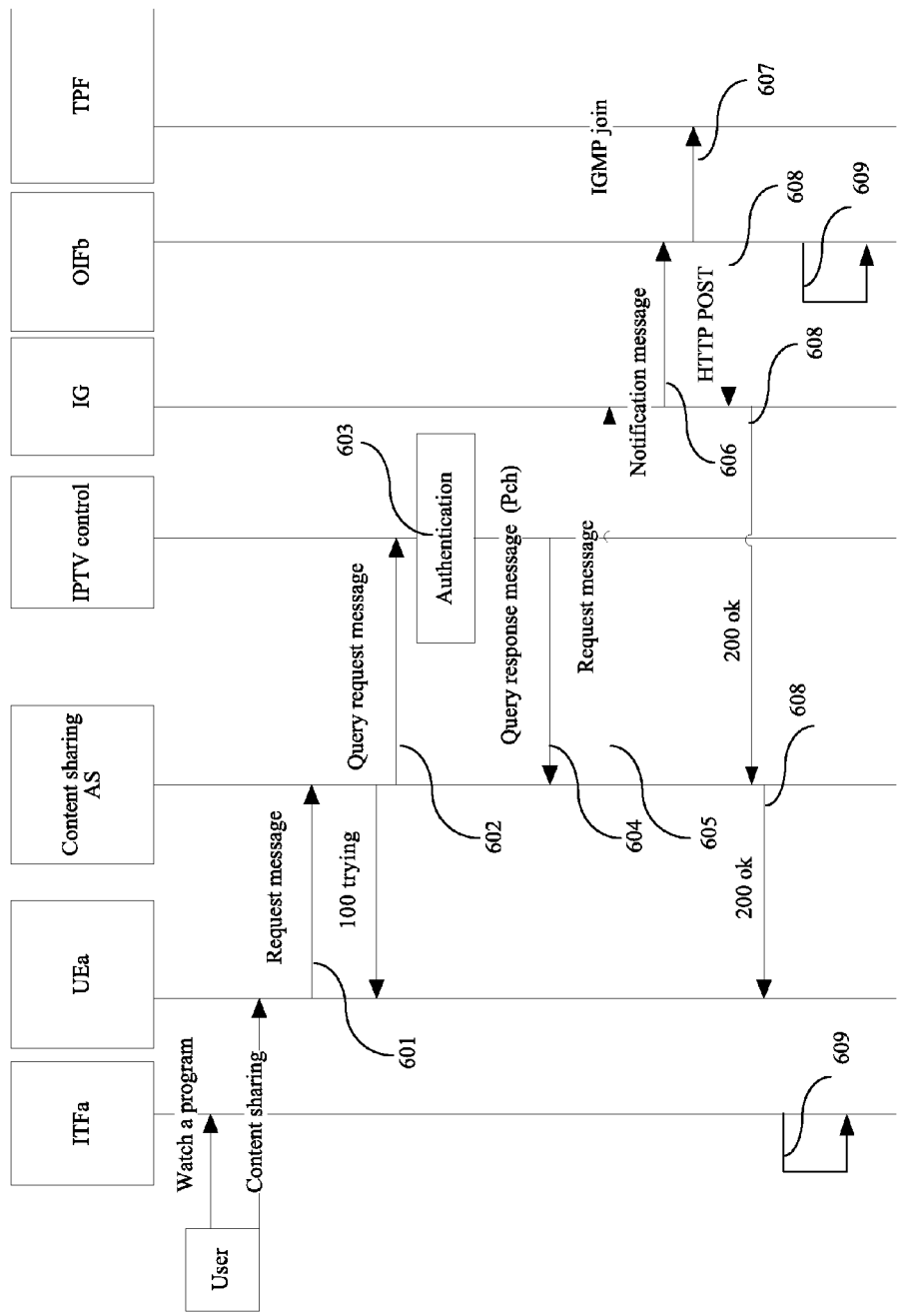
FIG. 6 is a schematic flow chart of a fifth specific embodiment of the present invention.

FIG. 6 is a schematic flow chart of a fifth specific embodiment of the present invention. As shown in FIG. 6, the following steps are included.

Step 601 to step 608 are basically the same as step 201 to step 208 in the embodiment shown in FIG. 2, and a difference only lies in that, in step 604, a query response message (Response) returned by an IPTV control server to a content sharing application server further carries a channel changing schedule of a second terminal ITF. Specifically, the channel changing schedule may include content such as channel information and channel changing time arrangement, which may also be referred to as personalized channel (PCh) information. Moreover, the channel changing schedule is carried in a request message (Invite) and a notification message (Notification Mechanism), and is sent to an OITF of a receiving terminal. This method further includes the following step.

Step 609: When the second terminal changes a channel according to a preset channel changing schedule (Change Channel According to Schedule) and plays IPTV content that is to be played after changing, an OITF terminal obtains corresponding IPTV content according to the channel changing schedule. In this embodiment, synchronous IPTV content sharing between the OITF terminal and the second terminal is implemented.

Figure 7:
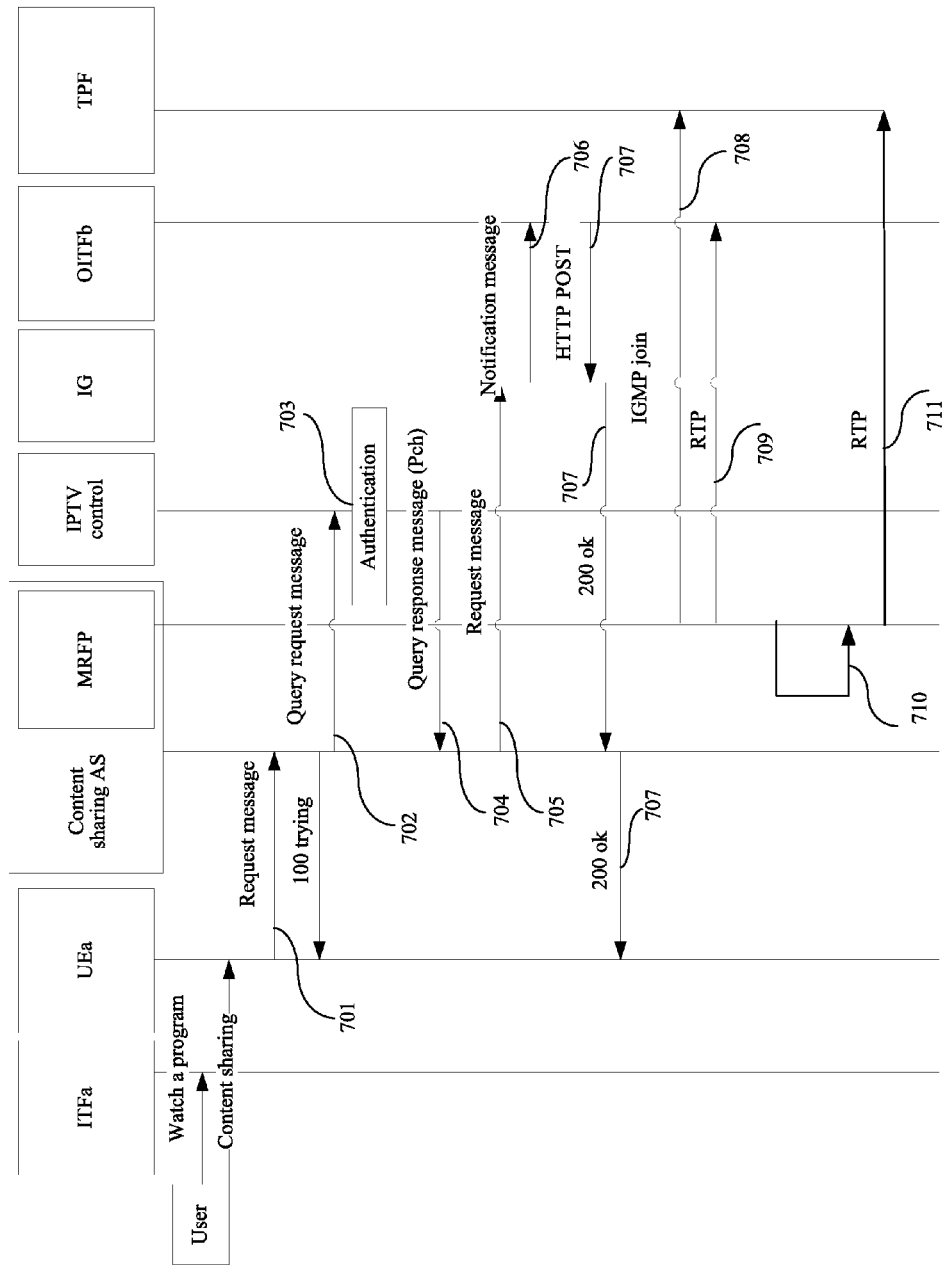
FIG. 7 is a schematic flow chart of a sixth specific embodiment of the present invention.

FIG. 7 is a schematic flow chart of a sixth specific embodiment of the present invention. This embodiment is a technical solution for implementing synchronous IPTV content sharing between an OITF terminal and a second terminal on the basis of the embodiment shown in FIG. 3, which specifically includes the following steps.

Step 701 to step 709 are basically the same as step 301 to step 309 in the embodiment shown in FIG. 3, and a difference only lies in that, in step 704, a query response message (Response) returned by an IPTV control server to a content sharing application server further carries a channel changing schedule of a second terminal ITF. Specifically, the channel changing schedule may include content such as channel information and channel changing time arrangement, which may also be referred to as PCh information. This method further includes the following steps.

Step 710: An MRFP updates IPTV content according to the channel changing schedule.

Step 711: An OITF terminal obtains, from the MRFP, IPTV content that is played by the second terminal ITFa after channel changing.

Figure 8:
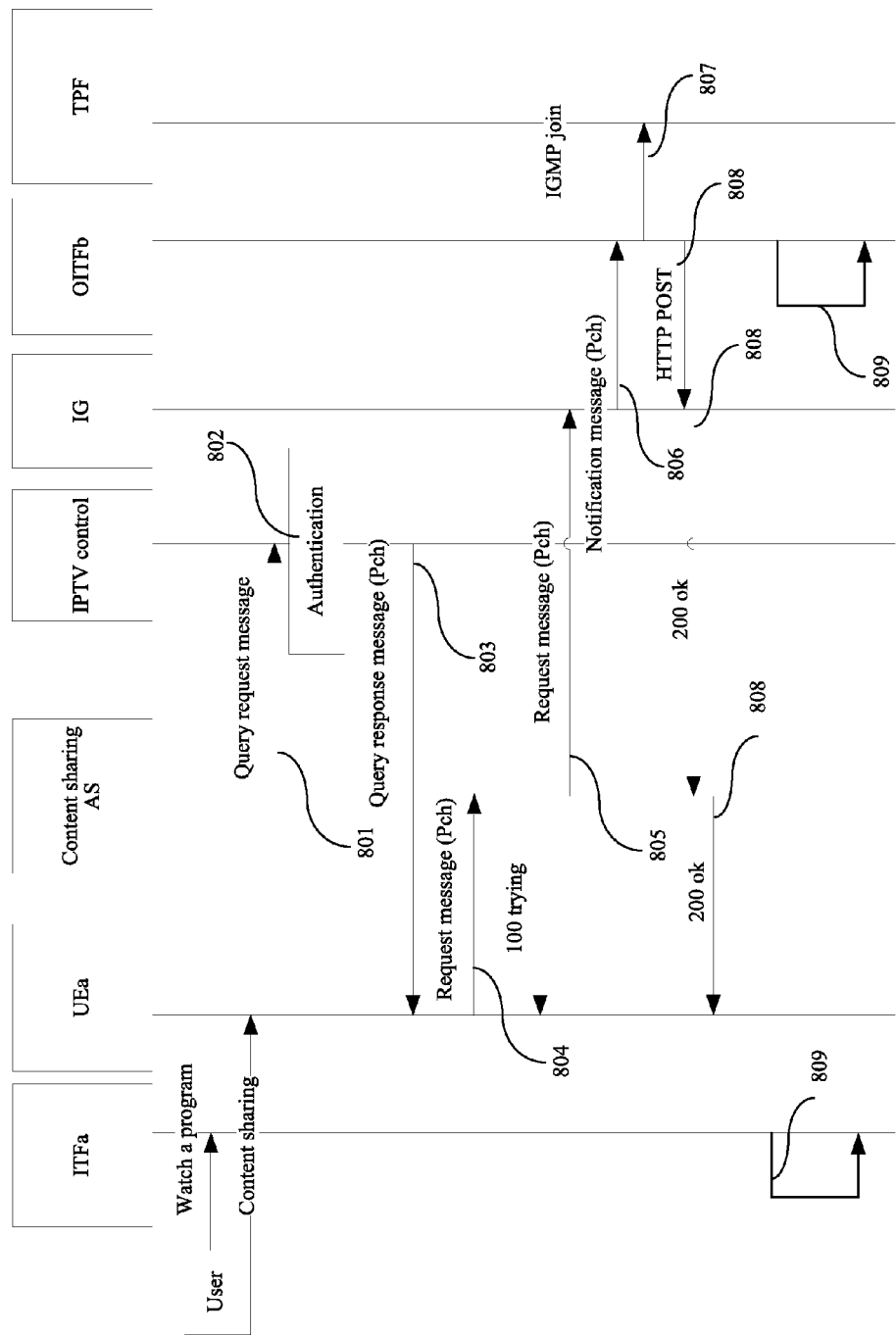
FIG. 8 is a schematic flow chart of a seventh specific embodiment of the present invention.

FIG. 8 is a schematic flow chart of a seventh specific embodiment of the present invention. This embodiment is a technical solution for implementing synchronous IPTV content sharing between an OITF terminal and a second terminal on the basis of the embodiment shown in FIG. 4, which specifically includes the following steps.

Step 801 to step 808 are the same as step 401 to step 408 in the embodiment shown in FIG. 4, and a difference only lies in that, in step 803, a query response message (Response) returned by an IPTV control server to a first terminal UEa further carries a channel changing schedule of a second terminal ITF. Specifically, the channel changing schedule may include content such as channel information and channel changing time arrangement, which may also be referred to as PCh information. Moreover, the channel changing schedule is carried in a request message (Invite) and a notification message (Notification Mechanism) and is sent to an OITF of a receiving terminal. This method further includes the following step.

Step 809: When the second terminal changes a channel according to a preset channel changing schedule and plays IPTV content that is to be played after changing, an OITF terminal obtains corresponding IPTV content according to the channel changing schedule. In this embodiment, synchronous IPTV content sharing between the OITF terminal and the second terminal is implemented.

Figure 9:
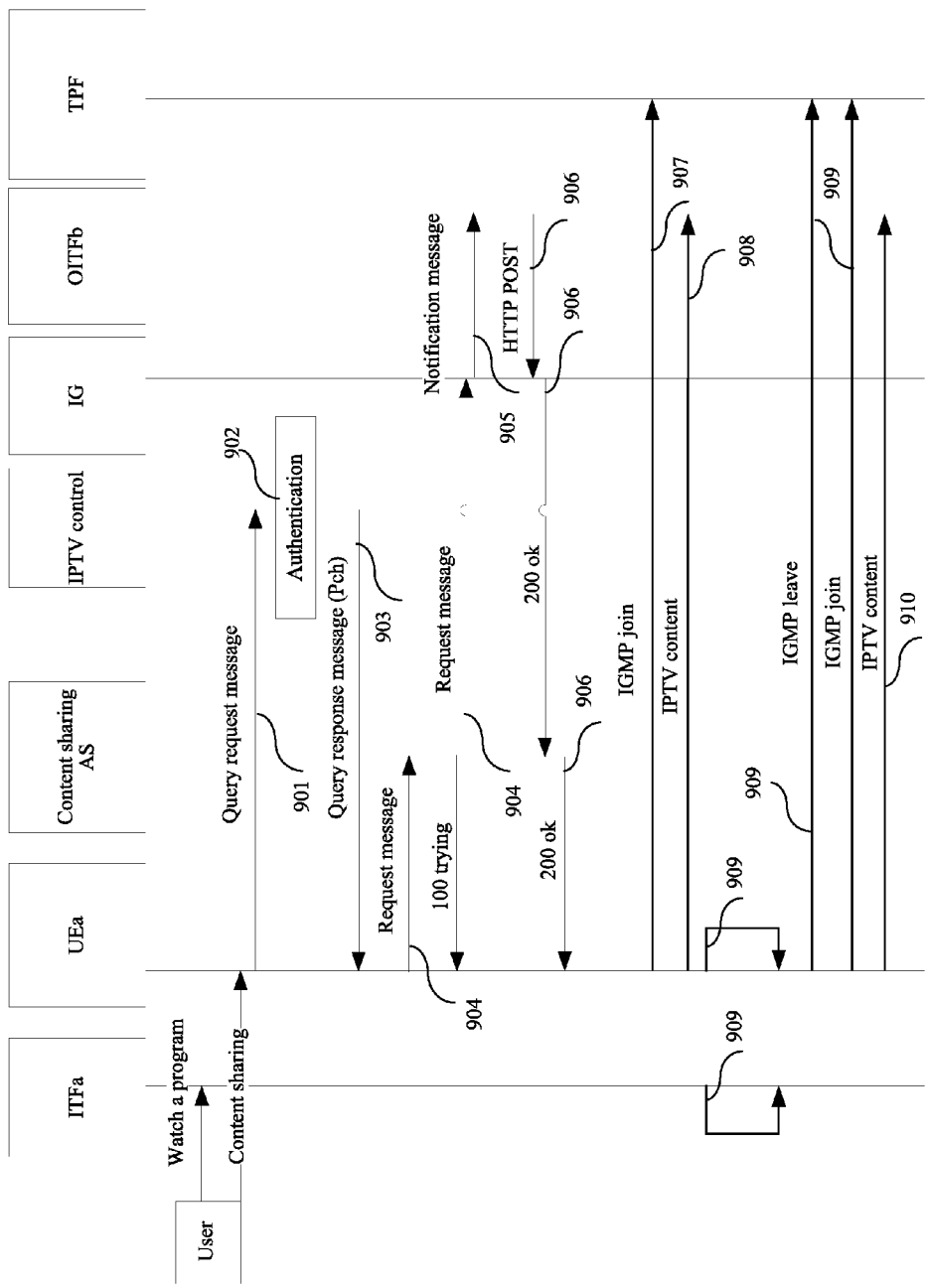
FIG. 9 is a schematic flow chart of an eighth specific embodiment of the present invention.

FIG. 9 is a schematic flow chart of an eighth specific embodiment of the present invention. This embodiment is a technical solution for implementing synchronous IPTV content sharing between an OITF terminal and a second terminal on the basis of the embodiment shown in FIG. 5, which specifically includes the following steps.

Step 901 to step 908 are the same as step 501 to step 508 in the embodiment shown in FIG. 5, and a difference only lies in that, in step 903, a query response message (Response) returned by an IPTV control server to a first terminal UEa further carries a channel changing schedule of a second terminal ITF, which may also be referred to as PCh information. This method further includes the following steps.

Step 909: When the second terminal changes a channel according to a preset channel changing schedule and plays IPTV content that is to be played after changing, the first terminal UEa performs changing according to the channel changing schedule, performs IGMP leave to separate an original channel, and according to channel information after changing, further performs IGMP join, so as to obtain IPTV content that is on a channel after changing.

Step 910: The UEa delivers the obtained and updated IPTV content to an OITF, for example, transmission may be performed according to an RTP protocol. In this embodiment, synchronous IPTV content sharing between the OITF terminal and the second terminal is implemented.

In the foregoing embodiments of the present invention, a first terminal or a content sharing application server initiates a query request message to an IPTV control server, so as to query for identification information of IPTV content that is being played by a second terminal. A technical solution for synchronous sharing is implemented through a channel changing schedule. In addition, in another technical solution, a first terminal or a content sharing application server obtains, from an IPTV control server in a subscription manner, identification information of IPTV content that is being played by a second terminal. When the content that is played by the second terminal changes, the IPTV control server is actively notified, and then the IPTV control server notifies the first terminal or the content sharing application server, thereby implementing synchronous IPTV content sharing between an OITF terminal and the second terminal.

Figure 10:
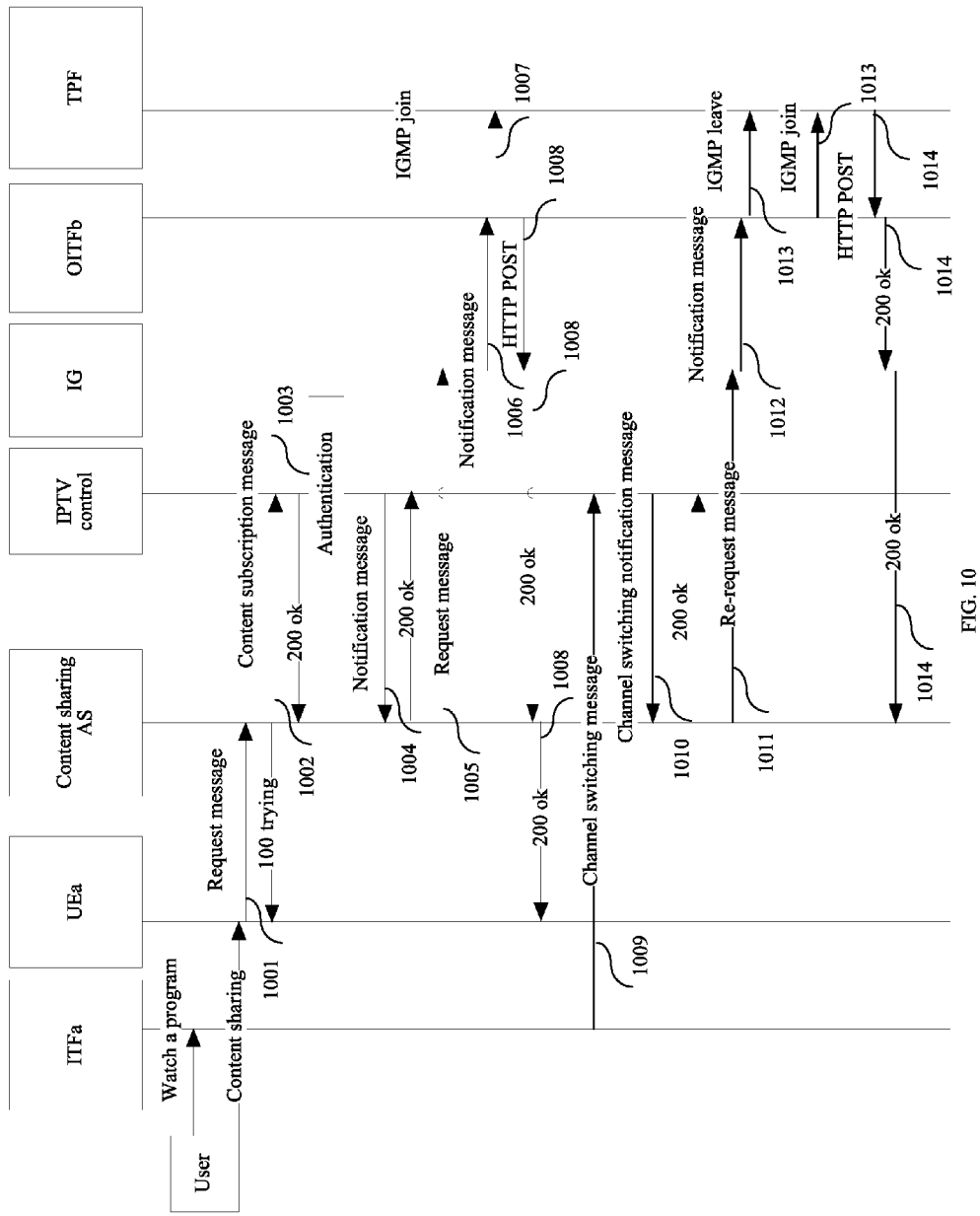
FIG. 10 is a schematic flow chart of a ninth specific embodiment of the present invention.

Specifically, FIG. 10 is a schematic flow chart of a ninth specific embodiment of the present invention. In this embodiment, a first terminal UEa initiates a request message to trigger subscription performed by a content sharing application server on identification information of IPTV content that is being played by a second terminal. After obtaining the identification information, as described in the foregoing embodiment, the content sharing application server may directly or indirectly provide a receiving terminal with the IPTV content that is being played by the second terminal. When the IPTV content that is played by the second terminal changes, an IPTV control server is actively notified, and the IPTV control server sends changed identification information to the content sharing application server. The content sharing application server directly or indirectly provides, in the same manner, the receiving terminal with the IPTV content that is being played by the second terminal. The following steps may be included.

Step 1001: A UEa sends a request message (Invite) to a content sharing application server (content sharing AS), where the message indicates sharing of IPTV content that is being played by an ITFa that belongs to the same user with the UEa. Specifically, the UEa and the ITFa may be bound beforehand, and the foregoing request message does not need to carry a user identifier of a home user. After the request message of the UEa is received, it may be directly determined that program content that is being played by the ITFa is to be shared. Alternatively, in the case that the UEa and the ITFa are not bound, the request message may specifically carry a user identifier of a home user by adding a "@WhatOnTV" identifier in a uniform resource identifier (URI) in an extended manner. In addition, the request message may further carry a permission parameter of the home user. Moreover, the content sharing application server returns a 100 trying temporary response to the UEa, which indicates that processing is being performed.

Step 1002: The content sharing application server sends a content subscription message (Subscribe) that includes a user identifier to an IPTV control server (IPTV control), where the message may further carry a permission parameter; and the IPTV control server returns a response message (200 ok) after receiving the foregoing message.

Step 1003: After performing authentication on the request sent by the content sharing application server and determining that the content sharing application server has query permission, the IPTV control server finds for identification information of the IPTV content that is being played by the ITFa, where the identification information may be a content identifier (content ID) or access information of a channel (including information such as a channel identifier or a multicast address).

Step 1004: The IPTV control server returns a notification message (Notify) to the content sharing application server, where the notification message carries the identification information of the IPTV content that is being played by the ITFa, and the identification information may be a content identifier (content ID) or access information of a channel (including information such as a channel identifier or a multicast address); and the content sharing application server meanwhile returns a response message (200 ok) to the IPTV control server.

Step 1005: The content sharing application server sends a request message (Invite) to an IMS gateway (IG) of a receiving terminal, where the request message carries identification information of shared content, for example, may be a content identifier (content ID) or access information of a channel (including information such as a channel identifier or a multicast address).

Step 1006: The IG sends a notification message (Notification Mechanism) to a managed OITFb device, so as to send the foregoing content identifier (content ID) or the foregoing access information of the channel (such as the channel identifier or the multicast address) to the OITFb device.

Step 1007: The OITFb device accesses a program (IGMP Join) according to the foregoing identification information, and obtains corresponding IPTV content from a TPF.

Step 1008: The OITFb device returns a response message (HTTP POST, and 200 ok) to the UEa, so as to determine that sharing is performed normally.

Step 1009: When a user changes a channel of the IPTV content that is being played by the second terminal, or sends played content update due to other reasons, the second terminal ITFa sends a played content update message (Update content information) to the IPTV control server, where in the case of channel changing, the message may be a channel changing message.

Step 1010: The IPTV control server returns a notification message (Notify) to the content sharing application server, where the notification message carries identification information of IPTV content that is played by the second terminal and is updated. Specifically, in the case of channel changing, the notification message may be a channel changing notification message that carries a channel identifier of the second terminal after changing, and at the same time, the content sharing application server returns a response message (200 ok) to the IPTV control server.

Step 1011: The content sharing application server sends a re-request message (Re-invite) to the IG of the receiving terminal, where the re-request message carries the identification information of the IPTV content that is played by the second terminal and is updated. Specifically, in the case of channel changing, the foregoing identification information may be the channel identifier of the second terminal after changing.

Step 1012: The IG sends a notification message (Notification Mechanism) to an OITF terminal, where the notification message carries the identification information of the IPTV content that is played by the second terminal and is updated. Specifically, in the case of channel changing, the foregoing identification information may be the channel identifier of the second terminal after changing.

Step 1013: The OITFb obtains IPTV content according to the identification information of the IPTV content that is played by the second terminal and is updated; and specifically, in the case of channel changing, the OITFb performs IGMP leave to separate an original channel, and according to channel information after changing, further performs IGMP join, so as to obtain, from the TPF, IPTV content that is on a channel after changing.

Step 1014: The OITFb returns a response message (HTTP POST, and 200 ok) to the content sharing application server, so as to determine that sharing is performed normally.

The foregoing step 1009 to step 1014 may be performed each time when the content that is played by the second terminal is updated.

Figure 11:
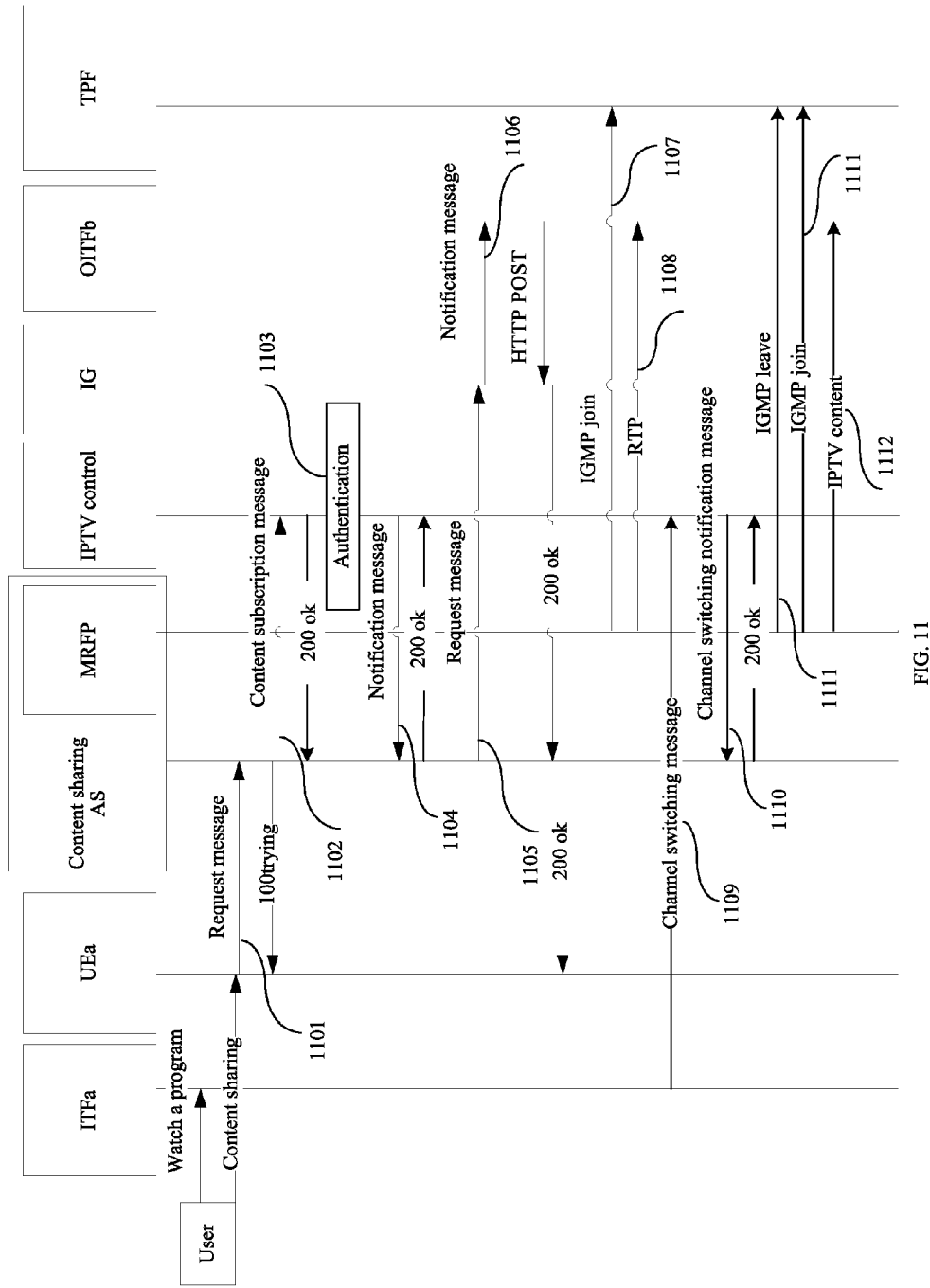
FIG. 11 is a schematic flow chart of a tenth specific embodiment of the present invention.

FIG. 11 is a schematic flow chart of a tenth specific embodiment of the present invention. This embodiment is similar to the embodiment shown in FIG. 10, and specifically includes the following steps.

Step 1101 to step 1106 are basically similar to step 1001 to step 1006 in the foregoing embodiment, and a difference lies in that, in step 1105 and step 1106, neither a request message (Invite) nor a notification message (Notification Mechanism) carries identification information of IPTV content that is being played by a second terminal.

Step 1107: An MRFP performs IGMP join according to the identification information of the IPTV content that is being played by the second terminal, so as to obtain corresponding IPTV content, where the identification information is obtained by the foregoing content sharing application server from an IPTV control server.

Step 1108: The MRFP delivers the foregoing obtained IPTV content to an OITFb of a receiving terminal.

Step 1109: When a user changes a channel of the IPTV content that is being played by the second terminal, or sends played content update due to other reasons, a second terminal ITFa sends a played content update message (Update content information) to the IPTV control server, where in the case of channel changing, the message may be a channel changing message.

Step 1110: The IPTV control server returns a notification message (Notify) to the content sharing application server, where the notification message carries identification information of IPTV content that is played by the second terminal and is updated. Specifically, in the case of channel changing, the notification message may be a channel changing notification message that carries a channel identifier of the second terminal after changing, and meanwhile, the content sharing application server returns a response message (200 ok) to the IPTV control server.

Step 1111: The MRFP obtains IPTV content according to the identification information of the IPTV content that is played by the second terminal and is updated, where the identification information is obtained by the foregoing content sharing application server from the IPTV control server. Specifically, in the case of channel changing, the MRFP performs IGMP leave to separate an original channel, and according to the channel information after changing, further performs IGMP join, so as to obtain, from a TPF, IPTV content that is on a channel after changing.

Step 1112: The MRFP delivers the foregoing obtained and updated IPTV content that is played by the second terminal to the OITF.

Figure 12:
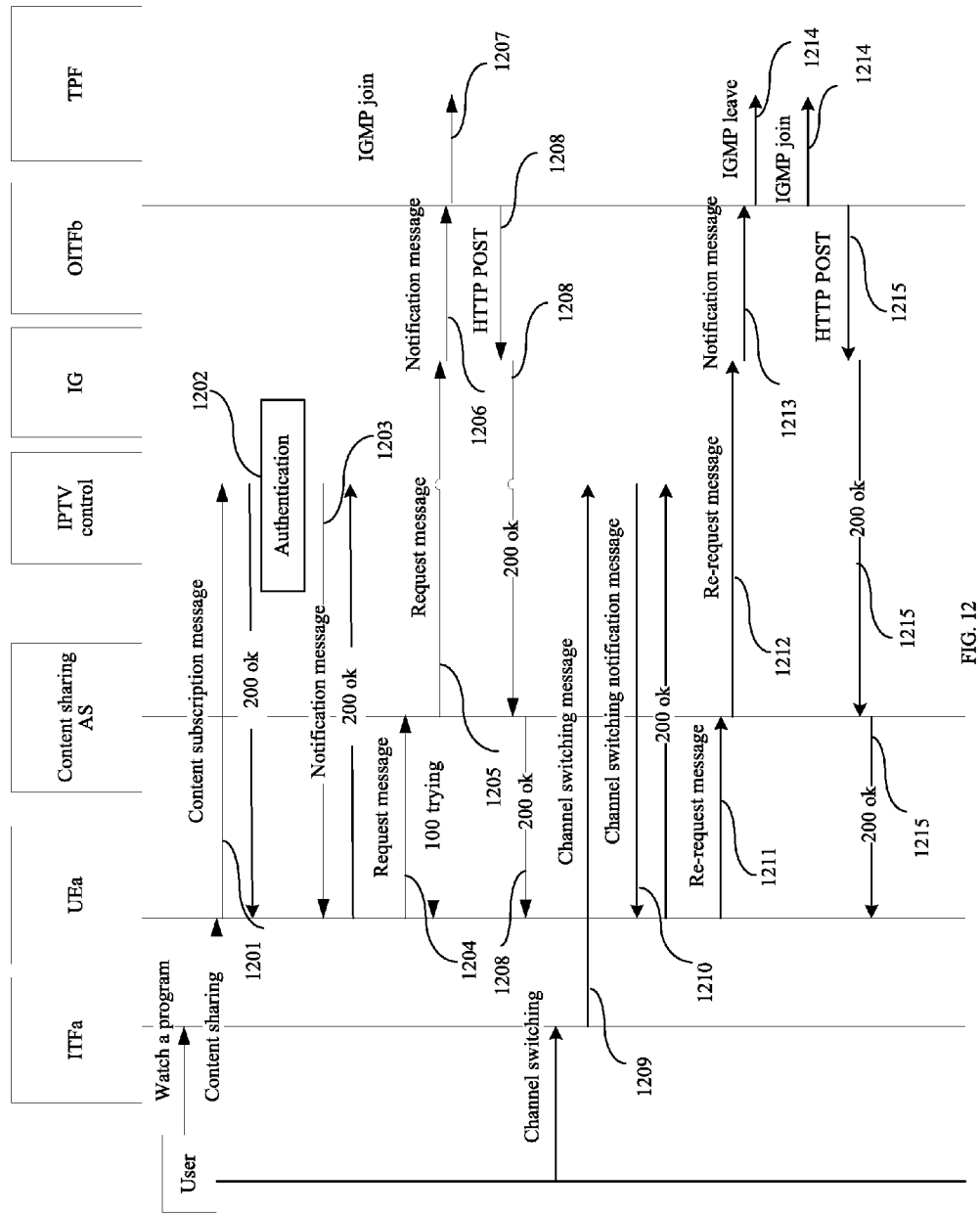
FIG. 12 is a schematic flow chart of an eleventh specific embodiment of the present invention.

FIG. 12 is a schematic flow chart of an eleventh specific embodiment of the present invention. In this specific embodiment, a first terminal UEa initiates subscription of identification information to an IPTV control server. The following steps are included.

Step 1201: A UEa sends a content subscription message (Subscribe) to an IPTV control server, where the content subscription message carries a user identifier of a home user of a second terminal. In the case that the first terminal and the second terminal are bound, the user identifier may also not be carried. In order to ensure information security, the foregoing content subscription message may further carry a permission parameter of the home user, and the IPTV control server returns a response message (200 ok) to the first terminal UEa.

Step 1202: After receiving the foregoing content subscription message, the IPTV control server performs authentication according to the permission parameter, and after the authentication succeeds, finds for identification information of IPTV content that is being played by the second terminal ITFa, where the identification information may specifically be a content identifier (content ID) or access information of a channel (including information such as a channel identifier or a multicast address).

Step 1203: The IPTV control server returns a notification message (Notify) to the first terminal UEa, where the notification message carries the identification information of the IPTV content that is being played by the second terminal. The first terminal UEa returns a response message (200 ok) to the IPTV control server.

Step 1204: After receiving the foregoing subscription result, the first terminal UEa sends a request message (Invite) to a content sharing application server, where the request message carries the identification information of the IPTV content that is being played by the second terminal, and at the same time, the content sharing application server returns, to the UEa, a response message (100 trying) indicating that processing is being performed.

Step 1205: The content sharing application server sends a request message (Invite) to an IMS gateway (IMS Gateway, hereinafter referred to as IG) of a receiving terminal, where the request message carries identification information of shared content, for example, may be a content identifier (content ID) or access information of a channel (including information such as a channel identifier or a multicast address).

Step 1206: The IG sends a notification message (Notification Mechanism) to a managed OITFb device, so as to send the foregoing content identifier (content ID) or the foregoing access information of the channel (such as the channel identifier or the multicast address) to the OITFb device.

Step 1207: The OITFb device accesses a program (IGMP Join) according to the foregoing identification information, and obtains corresponding IPTV content from a TPF.

Step 1208: The OITFb device returns a response message (HTTP POST, and 200 ok) to the UEa, so as to determine that sharing is performed normally.

Step 1209: When a user changes a channel of the IPTV content that is being played by the second terminal, or sends played content update due to other reasons, the second terminal ITFa sends a played content update message (Update content information) to the IPTV control server, where in the case of channel changing, the message may be a channel changing message.

Step 1210: The IPTV control server returns a notification message (Notify) to the first terminal UEa, where the notification message carries identification information of IPTV content that is played by the second terminal and is updated; and specifically, in the case of channel changing, the notification message may be a channel changing notification message that carries a channel identifier of the second terminal after changing, and at the same time, the first terminal UEa returns a response message (200 ok) to the IPTV control server.

Step 1211: The first terminal UEa sends a re-request message (Re-invite) to the content sharing application server, where the re-request message carries the identification information of the IPTV content that is played by the second terminal and is updated. Specifically, in the case of channel changing, the foregoing identification information may be the channel identifier of the second terminal after changing.

Step 1212: The content sharing application server sends a re-request message (Re-Invite) to the IG of the receiving terminal, where the re-request message carries the identification information of the IPTV content that is played by the second terminal and updated. Specifically, in the case of channel changing, the foregoing identification information may be the channel identifier of the second terminal after changing.

Step 1213: The IG sends a notification message (Notification Mechanism) to an OITF terminal, where the notification message carries the identification information of the IPTV content that is played by the second terminal and is updated. Specifically, in the case of channel changing, the foregoing identification information may be the channel identifier of the second terminal after changing.

Step 1214: The OITFb obtains IPTV content according to the identification information of the IPTV content that is played by the second terminal and is updated; and specifically, in the case of channel changing, the OITFb performs IGMP leave to separate an original channel, and according to channel information after changing, further performs IGMP join, so as to obtain, from the TPF, IPTV content that is on a channel after changing.

Step 1215: The OITFb returns a response message (HTTP POST, and 200 ok) to the content sharing application server, so as to determine that sharing is performed normally.

Figure 13:
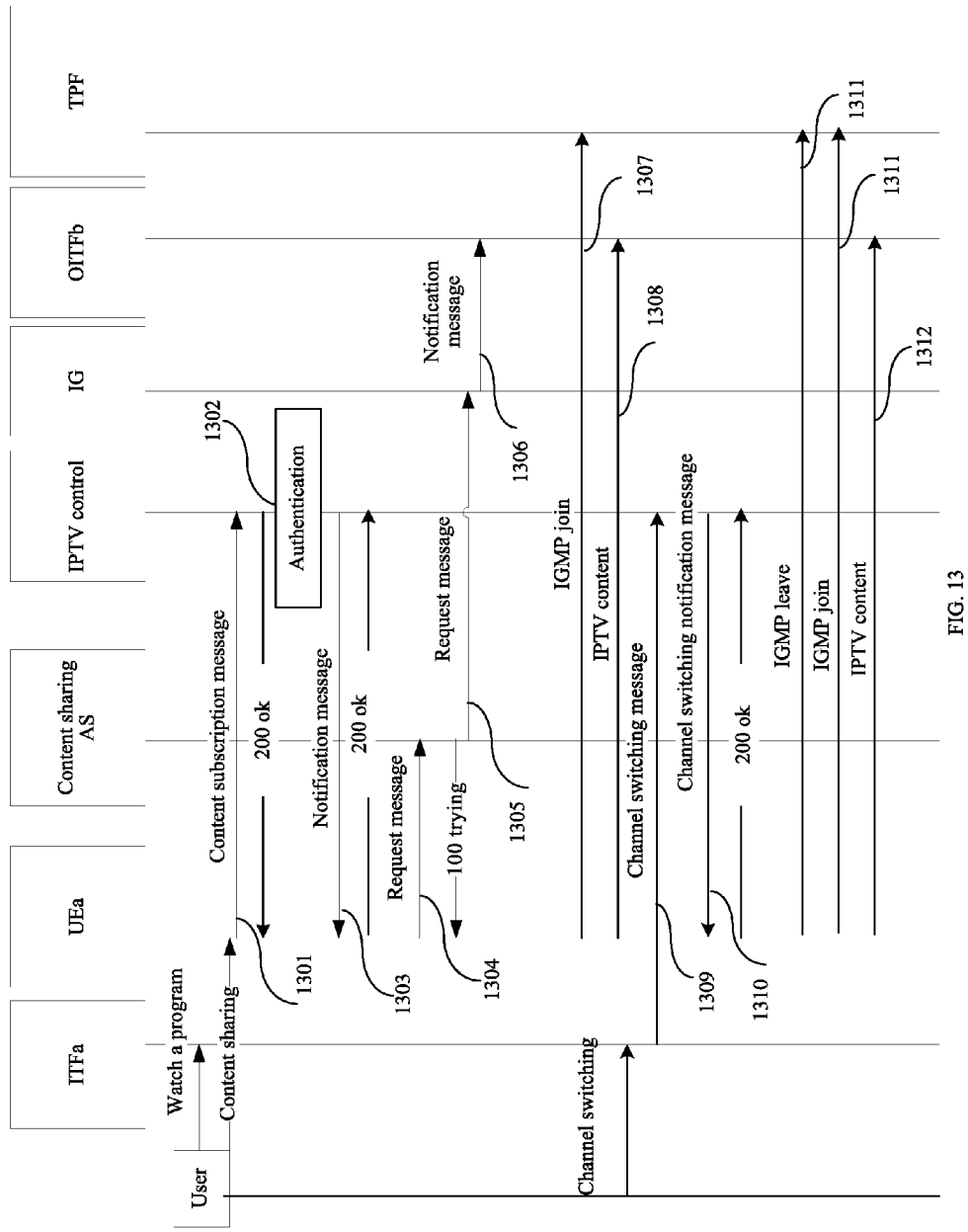
FIG. 13 is a schematic flow chart of a twelfth specific embodiment of the present invention.

FIG. 13 is a schematic flow chart of a twelfth specific embodiment of the present invention. The following steps are included.

Step 1301 to step 1306 are basically the same as step 1201 to step 1206 in the embodiment shown in FIG. 12, and a difference lies in that, a request message (Invite) and a notification message (Notification Mechanism) in step 1304, step 1305, and step 1306 do not carry identification information of IPTV content that is played by a second terminal. The following steps are further performed.

Step 1307: A UEa performs IGMP join (IGMP Join), and obtains corresponding IPTV content from a TPF according to the foregoing identification information.

Step 1308: The UEa delivers the foregoing obtained IPTV content to an OITF, for example, transmission may be performed according to an RTP protocol.

Step 1309: When a user changes a channel of the IPTV content that is being played by the second terminal, or sends played content update due to other reasons, a second terminal ITFa sends a played content update message (Update content information) to an IPTV control server, where in the case of channel changing, the message may be a channel changing message.

Step 1310: The IPTV control server returns a notification message (Notify) to a first terminal UEa, where the notification message carries identification information of IPTV content that is played by the second terminal and is updated. Specifically, in the case of channel changing initiated by the user, the notification message may be a channel changing notification message that carries a channel identifier of the second terminal after changing, and at the same time, the first terminal UEa returns a response message (200 ok) to the IPTV control server.

Step 1311: The first terminal UEa obtains IPTV content according to the identification information of the IPTV content that is played by the second terminal and is updated. Specifically, in the case of channel changing, the first terminal UEa performs IGMP leave to separate an original channel, and according to channel information after changing, further performs IGMP join, so as to obtain, from a TPF, IPTV content that is on a channel after changing.

Step 1312: The first terminal UEa sends the IPTV content that is played by the second terminal and is updated to an OITF device.

Figure 14:
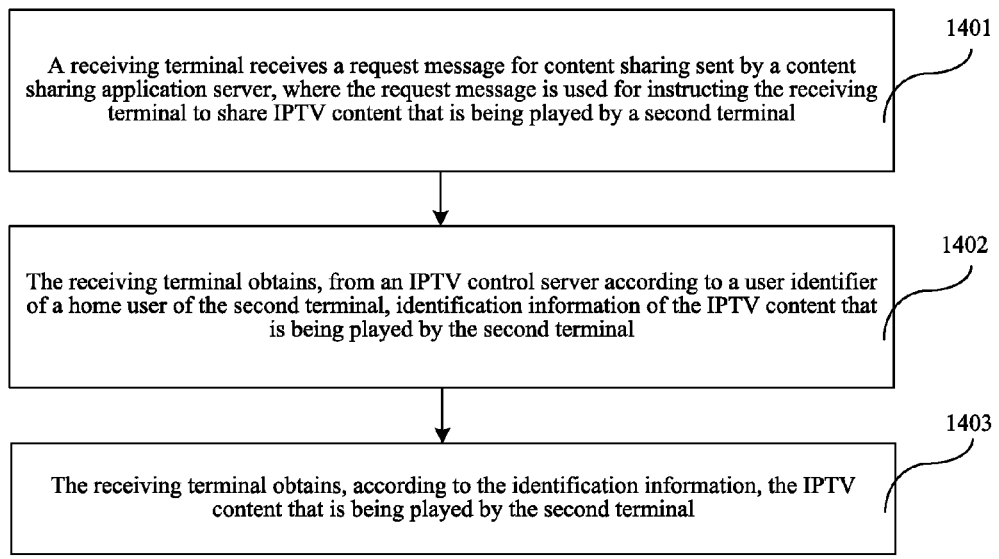
FIG. 14 is a schematic flow chart of a second embodiment of a method for sharing IPTV content according to the present invention.

An embodiment of the present invention further provides a technical solution in which a request message that is sent by a first terminal and is for sharing IPTV content that is played by a second terminal may be directly sent to a receiving terminal, and the receiving terminal obtains identification information of the IPTV content that is played by the second terminal, and then obtains, according to the identification information, the IPTV content that is played by the second terminal. FIG. 14 is a schematic flow chart of a second embodiment of a method for sharing IPTV content according to the present invention. As shown in FIG. 14, the following steps are included.

Step 1401: A receiving terminal receives a request message sent by a content sharing application server, where the request message is used for instructing the receiving terminal to share IPTV content that is being played by a second terminal.

Step 1402: The receiving terminal obtains, from an IPTV control server according to a user identifier of a home user of the second terminal, identification information of the IPTV content that is being played by the second terminal.

Step 1403: The receiving terminal obtains, according to the identification information, the IPTV content that is being played by the second terminal.

In the foregoing embodiment of the present invention, a receiving terminal obtains identification information of IPTV content that is played by a second terminal. Specifically, in the case that the second terminal does not support content sharing initiation, a first terminal initiates a request message, and then a content sharing application server sends a request message to the receiving terminal to instruct the receiving terminal to perform content sharing, which may implement sharing of the IPTV content that is played by the second terminal that does not support content sharing.

Specifically, in the foregoing embodiment, the receiving terminal obtains, from the IPTV control server according to the user identifier of the home user of the second terminal, the identification information of the IPTV content that is being played by the second terminal, which may include sending, by the receiving terminal, a query request message to the IPTV control server, where the query request message carries the user identifier of the home user of the second terminal, and receiving, by the receiving terminal, a query response message that is returned by the IPTV control server and carries the identification information of the IPTV content that is being played by the second terminal; or include sending, by the receiving terminal, a content subscription message to the IPTV control server, where the content subscription message carries the user identifier of the home user of the second terminal, and receiving, by the receiving terminal, a notification message that is returned by the IPTV control server and carries the identification information of the IPTV content that is being played by the second terminal.

When the identification information is obtained in a subscription manner and the identification information is a channel identifier, the method may further include the following steps. The receiving terminal receives a channel changing notification message that is sent by the IPTV control server and carries a channel identifier of the second terminal after channel changing, where the channel changing notification message is sent by the IPTV control server after the IPTV control server receives a channel changing message sent by the second terminal, and the receiving terminal obtains, according to the channel identifier after channel changing, IPTV content that is played by the second terminal after channel changing.

Figure 15:
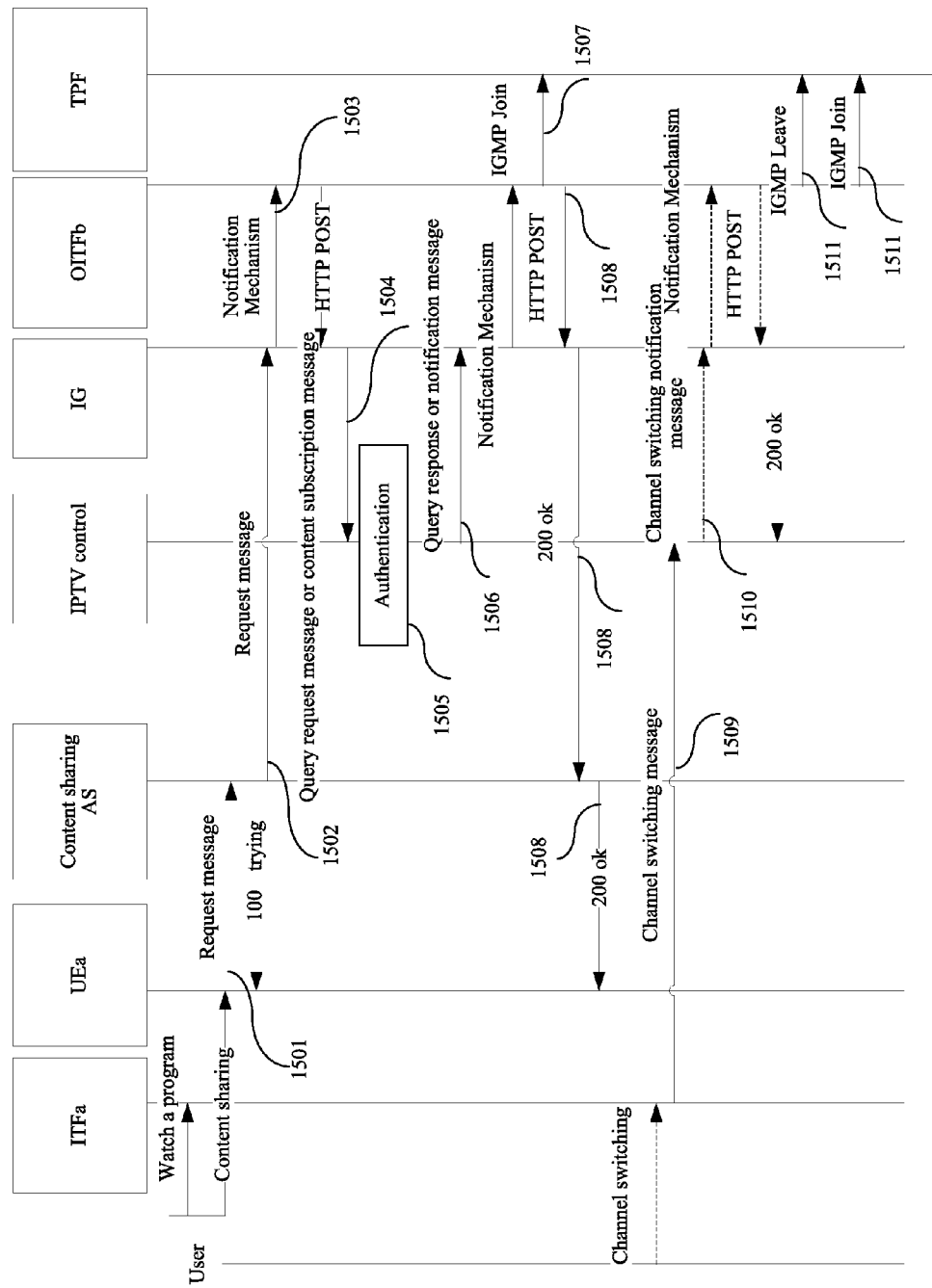
FIG. 15 is a schematic flow chart of a thirteenth specific embodiment of the present invention.

In the foregoing embodiments, querying the IPTV control for content that is being watched on an ITFa terminal, or a subscription operation on a state of content that is watched on the ITFa terminal may be performed by a receiving terminal (namely, IG+OITFb herein) of content sharing, where the querying or the subscription operation is performed by a content sharing initiator terminal or a content sharing application server. FIG. 15 is a schematic flow chart of a thirteenth embodiment of the present invention. As shown in FIG. 15, the following steps are included.

Step 1501: A UEa sends a request message (Invite) to a content sharing application server (content sharing AS), where the request message indicates sharing of IPTV content that is being played by an ITFa that belongs to the same user with the UEa. Specifically, the UEa and the ITFa may be bound beforehand, the request message does not need to carry a user identifier of a home user, and after the request message of the UEa is received, it may be directly determined that program content that is being played by the ITFa is to be shared. Alternatively, in the case that the UEa and the ITFa are not bound, the request message may specifically carry a user identifier of a home user by adding a "@WhatOnTV" identifier in a uniform resource identifier (URI) in an extended manner. In addition, the request message may further carry a permission parameter of the home user. Moreover, the content sharing application server returns a 100 trying temporary response to the UEa, which indicates that processing is being performed.

Step 1502: The content sharing application server sends a request message (Invite) to an IMS gateway (IG) of a receiving terminal, where the request carries information required for an instruction of content sharing.

Step 1503: The IG sends a notification message (Notification mechanism) to a managed OITFb device, so as to send, to the OITFb device, the information carried in the foregoing request message.

Step 1504: The OITFb device sends a query request message (Request) or a content subscription message (Subscribe) to an IPTV control server (IPTV control) through a home IG, where the query request message or the content subscription message includes the user identifier. With reference to the foregoing embodiment, if tracing of a changing state of content that is played by the ITFa is not considered, merely a query request is performed. If a changing state of content that is played by the ITFa needs to be traced, a subscription request is performed, where the message may further carry a permission parameter.

Step 1505: After performing authentication on the request that is sent by the OITFb device through the home IG and determining that the OITFb device has query permission, the IPTV control server finds for identification information of the IPTV content that is being played by the ITFa, where the identification information may be a content identifier (content ID) or access information of a channel (including information such as a channel identifier or a multicast address).

Step 1506: The IPTV control server returns a notification message or a query response message through the IG to the OITFb device, where the notification message or the query response message carries the identification information of the IPTV content that is being played by the ITFa, and the identification information may be a content identifier (content ID) or access information of a channel (including information such as a channel identifier or a multicast address).

Step 1507: The OITFb device accesses a program (IGMP Join) according to the foregoing identification information, and obtains corresponding IPTV content from a TPF.

Step 1508: The OITFb device returns a response message (HTTP POST, and 200 ok) to the UEa, so as to determine that sharing is performed normally.

Step 1509: When a user changes a channel of the IPTV content that is being played by the second terminal, or sends played content update due to other reasons, the second terminal ITFa sends a played content update message (Update content information) to the IPTV control server, where in the case of channel changing, the message may be a channel changing message.

Step 1510: The IPTV control server returns a notification message (Notify) to the OITFb device through the IG, where the notification message carries identification information of IPTV content that is played by the second terminal and is updated; and specifically, in the case of channel changing, the notification message may be a channel changing notification message that carries a channel identifier of the second terminal after changing, and at the same time, the content sharing application server returns a response message (200 ok) to the IPTV control server.

Step 1511: The OITFb obtains IPTV content according to the identification information of the IPTV content that is played by the second terminal and is updated. Specifically, in the case of channel changing, the OITFb performs IGMP leave to separate an original channel, and according to channel information after changing, further performs IGMP join, so as to obtain, from the TPF, IPTV content that is on a channel after changing.

The foregoing step 1509 to step 1511 may be performed each time when the content that is played by the second terminal is updated. In the foregoing embodiments of the present invention, the OITF+IG are equivalent to an IMS/SIP terminal device (such as a mobile phone). Therefore, an OITF+IG solution involved in the foregoing embodiments of the present invention are also applicable to a case of an IMS/SIP terminal device such as a mobile phone. In the same way, the receiving terminal in the foregoing embodiments of the present invention may transfer a content sharing session to another specified terminal for receiving (for example, an IMS/SIP mobile phone may be used as a first receiving terminal, and after a content sharing request is received, the content sharing request is transferred, through an SIP refer mechanism, to the OITF+IG that are used as a second receiving terminal). In the embodiments of the present invention, authentication and session management (ASM), a logical function and a call session control function (CSCF) of an IMS, or a SIP proxy, namely, a logical SIP proxy (a CSCF entity in the IMS and an ASM entity in the IPTV) is mainly used to complete authentication (if required) and SIP message forwarding, and also forwards a SIP message in the embodiment, but are not enumerated one by one in specific schematic figures because the authentication and session management merely performs forwarding rather than processing, which may be understood by persons skilled in the art.

Figure 16:
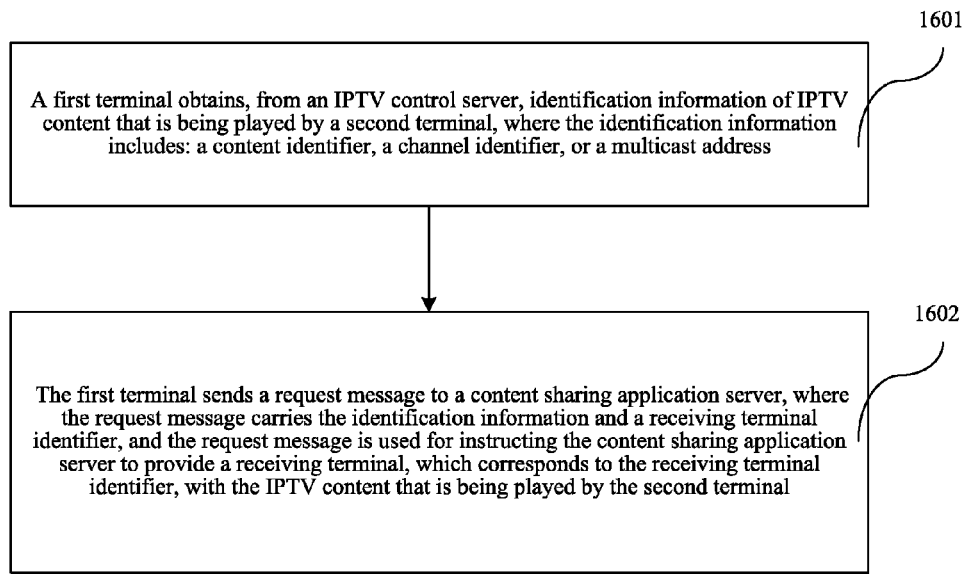
FIG. 16 is a schematic flow chart of a third embodiment of a method for sharing IPTV content according to the present invention.

An embodiment of the present invention further provides a method for sharing IPTV content. FIG. 16 is a schematic flow chart of a third embodiment of a method for sharing IPTV content according to the present invention. In this embodiment, a first terminal obtains identification information of IPTV content that is being played by a second terminal, and initiates content sharing, and the following steps are specifically included.

Step 1601: A first terminal obtains, from an IPTV control server, identification information of IPTV content that is being played by a second terminal, where the identification information includes a content identifier, a channel identifier, or a multicast address.

Step 1602: The first terminal sends a request message to a content sharing application server, where the request message carries the identification information and a receiving terminal identifier. The request message is used for instructing the content sharing application server to provide a receiving terminal, which corresponds to the receiving terminal identifier, with the IPTV content that is being played by the second terminal.

In the foregoing embodiment of the present invention, a first terminal obtains identification information of IPTV content that is played by a second terminal, and content sharing is performed between a receiving terminal and the second terminal according to the identification information, so that in the case that the second terminal does not have a capability of initiating content sharing, sharing of the IPTV content that is being played by the second terminal on another terminal device may be implemented.

The first terminal obtains the identification information of the IPTV content that is being played by the second terminal in the foregoing step 1601, which may be as follows. The first terminal sends a query request message used for querying for the identification information of the IPTV content that is being played by the second terminal to the IPTV control server, and receives a query response message that is returned by the IPTV control server and carries the identification information of the IPTV content that is being played by the second terminal. Specifically, referring to the embodiments shown in FIG. 4, FIG. 5, FIG. 8, and FIG. 9, the first terminal may obtain, in a querying manner, the identification information of the IPTV content that is being played by the second terminal.

In addition, the first terminal obtains the identification information of the IPTV content that is being played by the second terminal in the foregoing step 1601, which may be as follows. The first terminal sends a subscription message for subscribing to the identification information of the IPTV content that is being played by the second terminal to the IPTV control server, and receives a notification message that is returned by the IPTV control server and carries the identification information of the IPTV content that is being played by the second terminal. Specifically, referring to the embodiments shown in FIG. 12 and FIG. 13, the first terminal may obtain, in a subscription manner, the identification information of the IPTV content that is being played by the second terminal.

The first terminal performs, between the receiving terminal and the second terminal according to the identification information, content sharing of the IPTV content that is being played by the second terminal in step 1602 in the foregoing embodiment, which may be as follows. The first terminal obtains, according to the identification information, the IPTV content that is being played by the second terminal, and forwards the IPTV content that is being played by the second terminal to the receiving terminal, and for details, reference may be made to the embodiment shown in FIG. 5, FIG. 9 or FIG. 13; or may be as follows. The first terminal sends a request message to the content sharing application server, where the request message carries the identification information of the IPTV content that is being played by the second terminal, and the request message is used for instructing the content sharing application server to provide the receiving terminal, which corresponds to the receiving terminal identifier, with the IPTV content that is being played by the second terminal, and for details, reference may be made to the embodiment shown in FIG. 4, FIG. 8 or FIG. 12.

An embodiment of the present invention further provides a solution for maintaining content sharing synchronization between a receiving terminal and a second terminal. Specifically, when a first terminal sends a query request message to an IPTV control server, identification information of IPTV content that is being played by the second terminal is a channel identifier, and the query response message further includes a channel changing schedule of the second terminal, the method further includes obtaining, by the first terminal, according to the channel changing schedule, IPTV content that is played by the second terminal after channel changing, and forwarding the IPTV content that is played by the second terminal after channel changing to the receiving terminal. For details, reference may be made to the embodiment shown in FIG. 9.

Alternatively, when the first terminal sends a subscription message to the IPTV control server, and the identification information of the IPTV content that is being played by the second terminal is a channel identifier, the method further includes receiving a channel changing notification message that is sent by the IPTV control server and carries a channel identifier of the second terminal after channel changing, and sharing the IPTV content that is being played by the second terminal with the receiving terminal according to the channel identifier of the second terminal after channel changing. For details, reference may be made to the embodiment shown in FIG. 13.

In the foregoing embodiment of the present invention, the first terminal obtains the identification information of the IPTV content that is being played by the second terminal, and further initiates, according to the foregoing identification information, sharing of the IPTV content that is being played by the second terminal. In addition, the first terminal may also directly send a request message without obtaining the foregoing identification information. For this implementation manner, a terminal device performs the following method.

The first terminal sends a request message to the content sharing application server, where the request message is used for instructing the content sharing application server to provide the receiving terminal, which corresponds to the receiving terminal identifier, with the IPTV content that is being played by the second terminal, the first terminal and the second terminal are bounded terminals that belong to the same user, or the request message carries a user identifier of a home user of the second terminal.

In this embodiment, the first terminal and the second terminal are two terminal devices that are separately disposed. The first terminal initiates sharing of content that is played by the second terminal, so that in the case that the second terminal does not support content sharing and the second terminal does not need to be improved, sharing of the content that is played by the second terminal is implemented.

Figure 17:
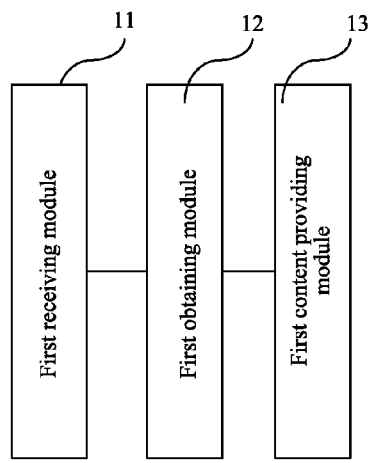
FIG. 17 is an apparatus schematic diagram of a first embodiment of an apparatus for sharing IPTV content according to the present invention.

FIG. 17 is a schematic structural diagram of a first embodiment of an apparatus for sharing IPTV content according to the present invention. As shown in FIG. 17, the apparatus includes a first receiving module 11, a first obtaining module 12, and a first content providing module 13. The first receiving module 11 is configured to receive a request message that is sent by a first terminal and includes a receiving terminal identifier, where the request message is used for the instruction of providing a receiving terminal, which corresponds to the receiving terminal identifier, with IPTV content that is being played by a second terminal. The first obtaining module 12 is configured to obtain identification information of the IPTV content that is being played by the second terminal, where the identification information includes: a content identifier, a channel identifier, or a multicast address. The first content providing module 13 is configured to provide, according to the identification information, the receiving terminal with the IPTV content that is being played by the second terminal.

With the apparatus for sharing IPTV content provided in the foregoing embodiment of the present invention, a request message is sent by a different terminal, and a first terminal and a second terminal may be defined according to a capability of a terminal. For example, the first terminal may be a terminal that supports sharing, while the second terminal may be a terminal that does not support content sharing, for example, a user equipment such as a set-top box. The first terminal initiates a request message, so that sharing of IPTV content that is played by the second terminal can be implemented without improving the second terminal such as a set-top box.

Figure 18:
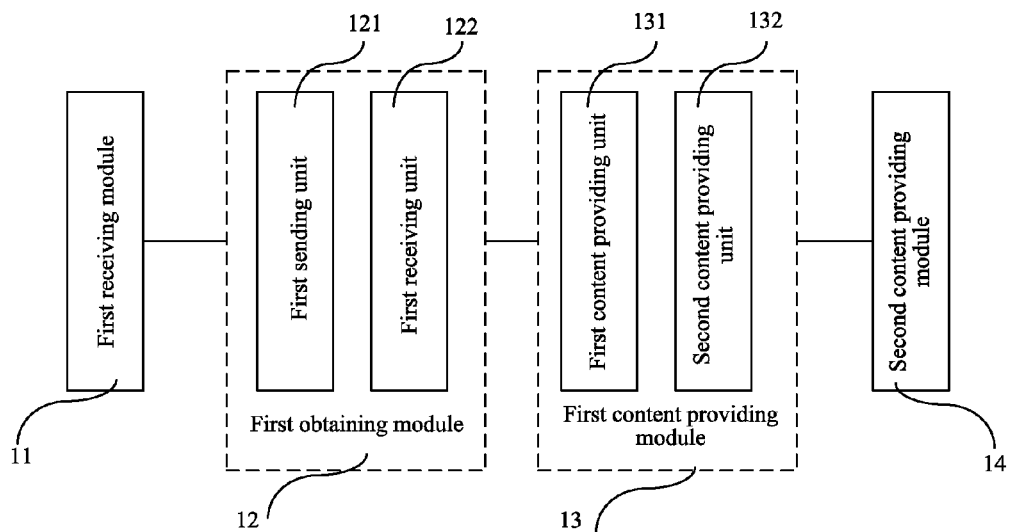
FIG. 18 is an apparatus schematic diagram of a second embodiment of an apparatus for sharing IPTV content according to the present invention.

In the foregoing embodiment of the present invention, as shown in FIG. 18, the first obtaining module 12 may include a first sending unit 121 and a first receiving unit 122. The first sending unit 121 is configured to query an IPTV control server for the identification information of the IPTV content that is being played by the second terminal or subscribe to the identification information of the IPTV content that is being played by the second terminal with the IPTV control server. The first receiving unit 122 is configured to receive the identification information of the IPTV content that is being played by the second terminal, where the identification information is returned by the IPTV control server. This embodiment is directed to a case that the request message does not carry the identification information of the IPTV content that is being played by the second terminal. If the request message received by the first receiving module carries the identification information of the IPTV content that is being played by the second terminal, the first obtaining module includes an obtaining unit, where the obtaining unit is configured to obtain, from the request message, the identification information of the IPTV content that is being played by the second terminal.

In addition, in the foregoing embodiment of the present invention, the first content providing module 13 may include at least one of a first content providing unit 131 and a second content providing unit 132. The first content providing unit 131 is configured to send a request message to the receiving terminal that corresponds to the receiving terminal identifier, where the request message carries the identification information of the IPTV content that is being played by the second terminal, so that the second terminal obtains, according to the identification information, the IPTV content that is being played by the second terminal. The second content providing unit 132 is configured to obtain, according to the identification information, the IPTV content that is being played by the second terminal and forward the IPTV content that is being played by the second terminal to the receiving terminal.

In addition, in view of a case that IPTV content that is played by the second terminal may change, the foregoing apparatus may further include a second content providing module 14. The second content providing module 14 is configured to, after the content that is played by the second terminal is updated, share IPTV content that is being played by the second terminal with the receiving terminal according to identification information of the content that is played by the second terminal and is updated.

The apparatus for sharing IPTV content provided in the foregoing embodiment of the present invention may be disposed in a content sharing application server.

Figure 19:
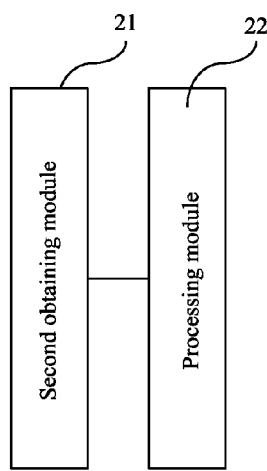
FIG. 19 is an apparatus schematic diagram of a first embodiment of a terminal device according to the present invention.

An embodiment of the present invention further provides a terminal device. The terminal device may implement the obtaining of identification information of IPTV content that is being played by a second terminal, and implement content sharing according to the foregoing identification information. FIG. 19 is a schematic structural diagram of a first embodiment of a terminal device according to the present invention. As shown in FIG. 19, the terminal device includes a second obtaining module 21 and a processing module 22. The second obtaining module 21 is configured to obtain, from an IPTV control server, identification information of IPTV content that is being played by a second terminal, where the identification information includes: a content identifier, a channel identifier, or a multicast address. The processing module 22 is configured to send a request message to a content sharing application server, where the request message carries the identification information and a receiving terminal identifier, and the request message is used for instructing the content sharing application server to provide a receiving terminal, which corresponds to the receiving terminal identifier, with the IPTV content that is being played by the second terminal.

In the foregoing embodiment of the present invention, a first terminal obtains identification information of IPTV content that is being played by a second terminal, and implements, according to the foregoing identification information, sharing of IPTV content that is played by the second terminal. In a different-terminal processing manner, sharing of the IPTV content that is played by the second terminal can be implemented without improving the second terminal that does not support sharing.

Figure 20:
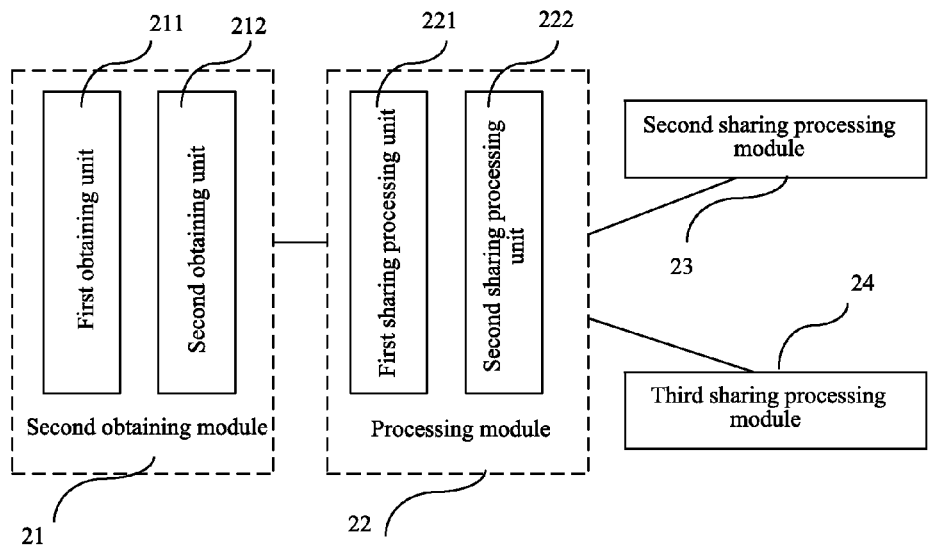
FIG. 20 is an apparatus schematic diagram of a second embodiment of a terminal device according to the present invention.

In addition, in the foregoing embodiment of the present invention, as shown in FIG. 20, the second obtaining module 21 may include at least one of the following obtaining units: a first obtaining unit 211 and a second obtaining unit 212. The first obtaining unit 211 is configured to send a query request message to the IPTV control server, where the query request message is used for querying for the identification information of the IPTV content that is being played by the second terminal and receive a query response message that is returned by the IPTV control server and carries the identification information of the IPTV content that is being played by the second terminal. The second obtaining unit 212 is configured to send a subscription message to the IPTV control server, where the subscription message is used for subscribing to the identification information of the IPTV content that is being played by the second terminal and receive a notification message that is returned by the IPTV control server and carries the identification information of the IPTV content that is being played by the second terminal.

In the foregoing embodiment of the present invention, the processing module 22 may include a first sharing processing unit 221 or a second sharing processing unit 222. The first sharing processing unit 221 is configured to obtain, according to the identification information, the IPTV content that is being played by the second terminal and forward the IPTV content that is being played by the second terminal to the receiving terminal. The second sharing processing unit 222 is configured to send a request message to the content sharing application server, where the request message carries the identification information of the IPTV content that is being played by the second terminal and the request message is used for instructing the content sharing application server to provide the receiving terminal, which corresponds to the receiving terminal identifier, with the IPTV content that is being played by the second terminal.

In addition, in view of a case that the content that is played by the second terminal changes, in order to further implement consistency of content that is played by the receiving terminal and the content that is played by the second terminal, the terminal device in the foregoing embodiment of the present invention may further include a second sharing processing module 23 or a third sharing processing module 24. The second sharing processing module 23 is configured to, when the first terminal sends a query request message to the IPTV control server, the identification information of the IPTV content that is being played by the second terminal is a channel identifier, and the query response message further includes a channel changing schedule of the second terminal, obtain, according to the channel changing schedule, IPTV content that is played by the second terminal after channel changing, and forward the IPTV content that is played by the second terminal after channel changing to the receiving terminal. The third sharing processing module 24 is configured to, when the first terminal sends a subscription message to the IPTV control server, and the identification information of the IPTV content that is being played by the second terminal is a channel identifier, receive a channel changing notification message that is sent by the IPTV control server and carries a channel identifier of the second terminal after changing, and share the IPTV content that is being played by the second terminal with the receiving terminal according to the channel identifier of the second terminal after changing.

In addition, an embodiment of the present invention further provides a terminal device. The terminal device includes a sharing request sending module. The module is configured to send a request message to a content sharing application server, where the request message is used for the instruction of sharing IPTV content that is being played by a second terminal with a receiving terminal. The first terminal and the second terminal are bound terminals that belong to the same user, or the request message carries a user identifier of a home user of the second terminal. This embodiment is a technical solution that is directed to that the identification information is obtained by the content sharing application server. The terminal device only needs to send the foregoing request message used for the instruction.

Figure 21:
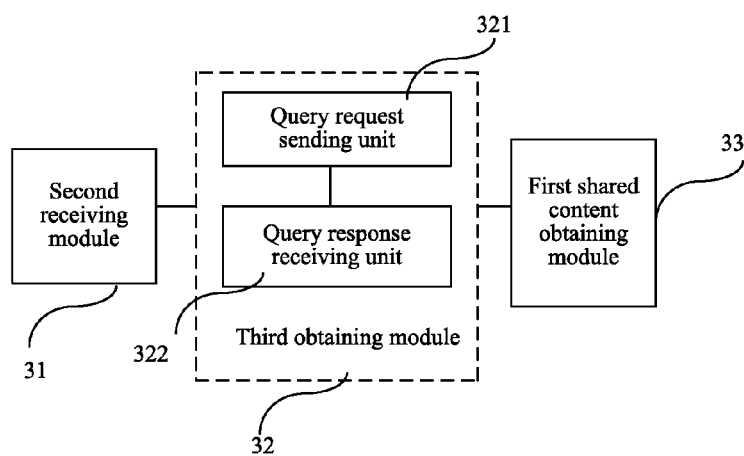
FIG. 21 is an apparatus schematic diagram of a third embodiment of a terminal device according to the present invention.

An embodiment of the present invention further provides a terminal device. FIG. 21 is a schematic structural diagram of a third embodiment of a terminal device according to the present invention. As shown in FIG. 21, the terminal device includes a second receiving module 31, a third obtaining module 32, and a first shared content obtaining module 33. The second receiving module 31 is configured to receive a request message that is sent by a content sharing application server, where the request message is used for instructing a receiving terminal to share IPTV content that is being played by a second terminal. The third obtaining module 32 is configured to obtain, according to a user identifier of a home user of the second terminal, from an IPTV control server, identification information of the IPTV content that is being played by the second terminal. The first shared content obtaining module 33 is configured to obtain, according to the identification information, the IPTV content that is being played by the second terminal.

In the foregoing embodiment of the present invention, the foregoing terminal device may be a receiving terminal, which obtains identification information of IPTV content that is played by a second terminal. Specifically, in the case that the second terminal does not support content sharing, a first terminal initiates a request message, and then a content sharing application server sends a request message to the receiving terminal to instruct the receiving terminal to perform content sharing, which may implement sharing of the IPTV content that is played by the second terminal that does not support content sharing.

As shown in FIG. 21, the third obtaining module 32 may include a query request sending unit 321 and a query response receiving unit 322. The query request sending unit 321 is configured to send a query request message to the IPTV control server, where the query request message carries a user identifier of a home user of the second terminal. The query response receiving unit 322 is configured to receive a query response message that is returned by the IPTV control server and carries the identification information of the IPTV content that is being played by the second terminal.

Figure 22:
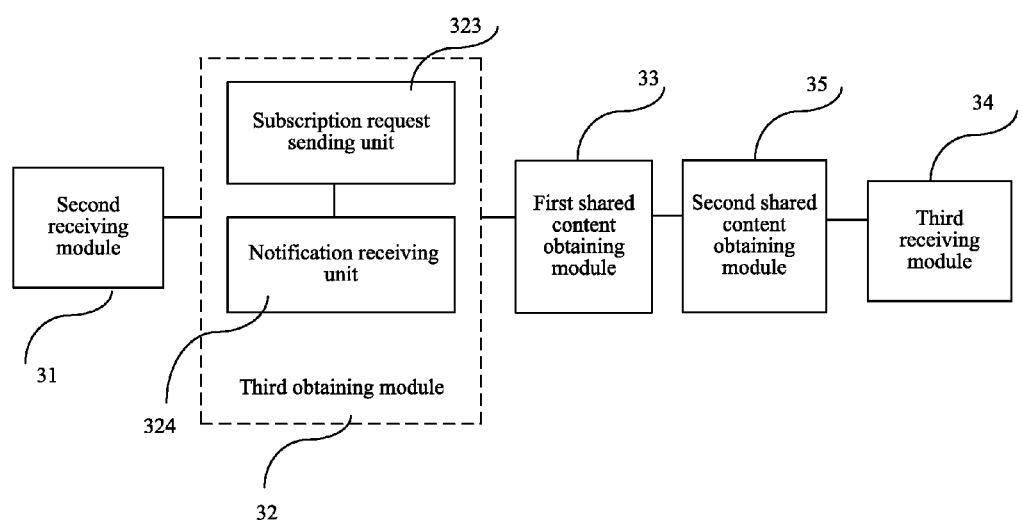
FIG. 22 is an apparatus schematic diagram of a fourth embodiment of a terminal device according to the present invention.

Alternatively, as shown in FIG. 22, the third obtaining module 32 may further include a subscription request sending unit 323 and a notification receiving unit 324. The subscription request sending unit 323 is configured to send a content subscription message to the IPTV control server, where the content subscription message carries a user identifier of a home user of the second terminal. The notification receiving unit 324 is configured to receive a notification message that is returned by the IPTV control server and carries the identification information of the IPTV content that is being played by the second terminal.

In addition, when the third obtaining module 32 includes the subscription request sending unit 323 and the notification receiving unit 324, the terminal device further includes a third receiving module 34 and a second shared content obtaining module 35. The third receiving module 34 is configured to receive a channel changing notification message that is sent by the IPTV control server and carries a channel identifier of the second terminal after channel changing, where the channel changing notification message is sent by the IPTV control server after the IPTV control server receives a channel changing message sent by the second terminal. The second shared content obtaining module 35 is configured to obtain, according to the channel identifier after channel changing, IPTV content that is played by the second terminal after channel changing.

Persons of ordinary skill in the art may understand that all or a part of the steps of the foregoing method embodiments may be implemented by a program instructing relevant hardware. The foregoing program may be stored in a computer readable storage medium. When the program is run, the steps of the foregoing method embodiments are performed. The foregoing storage medium may be any medium that is capable of storing program codes, such as a ROM, a RAM, a magnetic disk, or an optical disk.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to some technical features of the technical solutions, as long as these modifications or replacements do not cause the essence of corresponding technical solutions to depart from the spirit and scope of the technical solutions in the embodiments of the present invention.

What is claimed is:

1. A method for sharing Internet protocol television (IPTV) content, the method comprising:

receiving, by a content sharing application server, a first message sent by a first terminal, wherein the first message comprises a third terminal identifier and wherein the first message is used for an instruction of providing a third terminal, which corresponds to the third terminal identifier, with IPTV content that is being played by a second terminal;

obtaining, by the content sharing application server, identification information of the IPTV content that is being played by the second terminal, wherein the identification information comprises a content identifier, a channel identifier, or a multicast address; and providing, by the content sharing application server and according to the identification information, the third terminal with the IPTV content that is being played by the second terminal;

wherein providing, by the content sharing application server and according to the identification information, the third terminal with the IPTV content that is being played by the second terminal comprises:

sending, by the content sharing application server, a second message that comprises the identification information of the IPTV content that is being played by the second terminal to an IP multimedia system gateway of the third terminal, so that the IP multimedia system gateway sends a third message that comprises the identification information to an open IPTV terminal function of the third terminal, and the open IPTV terminal function obtains, according to the identification information, the IPTV content that is being played by the second terminal; or obtaining, by the content sharing application server, according to the identification information, the IPTV content that is being played by the second terminal, and sending a fourth message to an IP multimedia system gateway of the third terminal, so that the IP multimedia system gateway sends a fifth message to an open IPTV terminal function, and after receiving the fifth message, the open IPTV terminal function obtains, from the content sharing application server, the IPTV content that is being played by the second terminal; or wherein the first message further comprises the identification information of the IPTV content that is being played by the second terminal and wherein the identification information of the IPTV content that is being played by the second terminal is obtained from an IPTV control server by the first terminal through querying or subscription, obtaining, by the content sharing application server, from the first message, the identification information of the IPTV content that is being played by the second terminal, and then sending a thirteenth message that comprises the identification information of the IPTV content that is being played by the second terminal to an IP multimedia system gateway of the third terminal, so that the IP multimedia system gateway sends a fourteenth message to an open IPTV terminal function, wherein the fourteenth message carries the identification information, and the open IPTV terminal function obtains, according to the identification information, the IPTV content that is being played by the second terminal; or wherein the first message further comprises the identification information of the IPTV content that is being played by the second terminal and wherein the identification information of the IPTV content that is being played by the second terminal is obtained from an IPTV control server by the first terminal through querying or subscription, after the content sharing application server obtains, from the first message, the identification information of the IPTV content that is being played by the second terminal, obtaining, by the content sharing application server and according to the identification information, the IPTV content that is being played by the second terminal; and sending, by the content sharing application server, a fifteenth message to an IP multimedia system gateway of the third terminal, so that the IP multimedia system gateway sends a sixteenth message to an open IPTV terminal function, and after receiving the sixteenth message, the open IPTV terminal function obtains, from the content sharing application server, the IPTV content that is being played by the second terminal.

2. The method for sharing IPTV content according to claim 1, wherein obtaining, by the content sharing application server, the identification information comprises:

sending, by the content sharing application server, a sixth message that comprises a user identifier of a home user of the second terminal to an IPTV control server; and receiving, by the content sharing application server, a seventh message that is returned by the IPTV control server and comprises the identification information of the IPTV content that is being played by the second terminal.

3. The method for sharing IPTV content according to claim 1, wherein:

when the content sharing application server receives an eighth message that is returned by an IPTV control server and carries the identification information of the IPTV content that is being played by the second terminal, and the identification information is a channel identifier, the method further comprises:

receiving, by the content sharing application server, a ninth message that carries a channel identifier of the second terminal after channel changing and is sent by the IPTV control server after the IPTV control server receives a tenth message sent by the second terminal, and sending, by the content sharing application server, an eleventh message to the IP multimedia system gateway of the third terminal, wherein the eleventh message carries the channel identifier of the second terminal after channel changing, so that the IP multimedia system gateway sends a twelfth message to the open IPTV terminal function, wherein the twelfth message carries the channel identifier of the second terminal after channel changing, and the open IPTV terminal function obtains, according to the channel identifier of the second terminal after channel changing, IPTV content that is played by the second terminal after channel changing.

4. An apparatus for sharing Internet protocol television IPTV content, comprising:

a receiver, configured to receive a first message that is sent by a first terminal and comprises a third terminal identifier, wherein the first message is used for an instruction of providing a third terminal, which corresponds to the third terminal identifier, with IPTV content that is being played by a second terminal; and a processor, coupled to a non-transitory computer readable medium having a computer readable instruction stored thereon that, when executed by the processor, causes the processor to:

obtain identification information of the IPTV content that is being played by the second terminal, wherein the identification information comprises a content identifier, a channel identifier, or a multicast address;

provide, according to the identification information, the third terminal with the IPTV content that is being played by the second terminal, wherein to provide the third terminal with the IPTV content comprises:

sending a second message that comprises the identification information of the IPTV content that is being played by the second terminal to an IP multimedia system gateway of the third terminal, so that the IP multimedia system gateway sends a third message that comprises the identification information to an open IPTV terminal function of the third terminal, and the open IPTV terminal function obtains, according to the identification information, the IPTV content that is being played by the second terminal; or obtaining, according to the identification information, the IPTV content that is being played by the second terminal, and sending a fourth message to an IP multimedia system gateway of the third terminal, so that the IP multimedia system gateway sends a fifth message to an open IPTV terminal function, and after receiving the fifth message, the open IPTV terminal function obtains, from the content sharing application server, the IPTV content that is being played by the second terminal.

5. The apparatus for sharing IPTV content according to claim 4, wherein the instructions when executed further causes the processor to query an IPTV control server for the identification information of the IPTV content that is being played by the second terminal or to subscribe to the identification information of the IPTV content that is being played by the second terminal with the IPTV control server; and the receiver is further configured to receive the identification information of the IPTV content that is being played by the second terminal, wherein the identification information is returned by the IPTV control server.

6. The apparatus for sharing IPTV content according to claim 4, wherein the instructions when executed further causes the processor to send a sixth message to the third terminal that corresponds to the third terminal identifier, wherein the sixth message carries the identification information of the IPTV content that is being played by the second terminal, so that the third terminal obtains, according to the identification information, the IPTV content that is being played by the second terminal; and/or instructions when executed further causes the processor to obtain, according to the identification information, the IPTV content that is being played by the second terminal and to forward the IPTV content that is being played by the second terminal to the third terminal.

7. A terminal device, comprising:

a processor coupled to a non-transitory computer readable medium having a computer readable instruction stored thereon that, when executed by the processor, causes the processor to obtain, from an IPTV control server, identification information of IPTV content that is being played by a second terminal, wherein the identification information comprises a content identifier, a channel identifier, or a multicast address; and a transmitter, configured to send a first message to a content sharing application server, wherein the first message carries the identification information and a third terminal identifier, and wherein the first message is used for instructing the content sharing application server to provide a third terminal, which corresponds to the third terminal identifier, with the IPTV content that is being played by the second terminal;

wherein to provide the third terminal with the IPTV content comprises:

sending a second message that comprises the identification information of the IPTV content that is being played by the second terminal to an IP multimedia system gateway of the third terminal, so that the IP multimedia system gateway sends a third message that comprises the identification information to an open IPTV terminal function of the third terminal, and the open IPTV terminal function obtains, according to the identification information, the IPTV content that is being played by the second terminal; or obtaining, according to the identification information, the IPTV content that is being played by the second terminal, and sending a fourth message to an IP multimedia system gateway of the third terminal, so that the IP multimedia system gateway sends a fifth message to an open IPTV terminal function, and after receiving the fifth message, the open IPTV terminal function obtains, from the content sharing application server, the IPTV content that is being played by the second terminal.

8. The terminal device according to claim 7, wherein the instructions when executed further causes the processor to send a sixth message to the IPTV control server, wherein the sixth message is used for querying for the identification information of the IPTV content that is being played by the second terminal and receive a seventh message that is returned by the IPTV control server and carries the identification information of the IPTV content that is being played by the second terminal; and/or instructions when executed further causes the processor to send an eighth message to the IPTV control server, wherein the eighth message is used for subscribing to the identification information of the IPTV content that is being played by the second terminal and receive a ninth message that is returned by the IPTV control server and carries the identification information of the IPTV content that is being played by the second terminal.

\* \* \* \* \*